United States Patent
Kawada et al.

(10) Patent No.: US 7,440,827 B2
(45) Date of Patent: Oct. 21, 2008

(54) METHOD OF CONTROLLING SERIES HYBRID ELECTRIC VEHICLE POWERTRAIN

(75) Inventors: Takuji Kawada, Canton, MI (US); Nobuhide Seo, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 41 days.

(21) Appl. No.: 11/538,364

(22) Filed: Oct. 3, 2006

(65) Prior Publication Data
US 2007/0233332 A1 Oct. 4, 2007

Related U.S. Application Data

(63) Continuation-in-part of application No. 11/393,416, filed on Mar. 30, 2006, now Pat. No. 7,136,727.

(51) Int. Cl.
*B60L 9/00* (2006.01)
(52) U.S. Cl. ........................ 701/22; 180/65.2
(58) Field of Classification Search ............... 701/22, 701/48, 101, 54, 53, 102, 103, 115; 180/65.2, 180/65.3, 65.4; 290/40 C; 123/90.15, 90.16, 123/90.17, 90.31
See application file for complete search history.

(56) References Cited

U.S. PATENT DOCUMENTS

| | | | |
|---|---|---|---|
| 6,173,574 B1 | 1/2001 | Obayashi et al. | |
| 6,326,702 B1 | 12/2001 | Yonekura et al. | |
| 6,962,224 B2 * | 11/2005 | Nakanowatari | 180/65.2 |
| 7,325,521 B1 * | 2/2008 | Leiby et al. | 123/90.15 |

FOREIGN PATENT DOCUMENTS

JP    2002-47959 A    2/2002

* cited by examiner

*Primary Examiner*—Richard M. Camby
(74) *Attorney, Agent, or Firm*—Alleman Hall McCoy Russell & Tuttle LLP

(57) ABSTRACT

There is provided a method of controlling a power-train of a hybrid electric vehicle comprising an internal combustion engine, a first electric machine directly driven by the internal combustion engine for generating electricity, and a second electric machine driven at least partly with the electricity for driving the vehicle wheel. The method comprises adjusting the speed and adjusting the torque of the internal combustion engine, while substantially maintaining the intake manifold pressure, in response to a change of the desired electricity from the first electric machine. According to the method, the higher engine efficiency can be maintained, because the engine intake manifold pressure is maintained during adjusting the engine speed and torque. The engine speed may be adjusted corresponding to a speed of the first electric machine with higher efficiency and the desired output electricity. Therefore, both the engine and the first electric machine may achieve the respective higher efficiencies. Consequently, overall efficiency of a series HEV power-train can be improved.

27 Claims, 13 Drawing Sheets

METHOD OF CONTROLLING SERIES HYBRID ELECTRIC VEHICLE POWERTRAIN

BACKGROUND

The present description relates to a series hybrid electric vehicle (HEV) power-train, and more particularly relates to a method of controlling a series HEV power-train for improving operating efficiency of the power-train.

Series HEV power-trains have been presented, such as in U.S. Pat. No. 6,326,702. The series HEV power-train comprises an internal combustion engine, a first electric machine, and a second electric machine. The engine combusts fuel and converts chemical energy in the fuel to mechanical energy. Then, the engine directly drives the first electric machine, which generates electricity by converting the mechanical energy to the electrical energy. The second electric machine is usually not mechanically coupled to the engine or the first electric machine, but coupled to a vehicle driving wheel for propulsion of the vehicle.

On the other hand, electrically, the first and second electric machines are coupled to each other directly, or through an electric battery. Therefore, the electricity generated by the first electric machine may be directly supplied to the second electric machine or supplied to the electric battery for a later use by the second electric machine. Also, the second electric machine may regenerate electricity in a vehicle deceleration, and that electricity may be stored in the battery for a later use by the second electric machine as well.

From an energy conversion standpoint, the chemical energy in fuel is finally converted to the mechanical energy at the driving wheel, through the couple of energy conversions. For better fuel economy, it is necessary to improve an overall energy conversion efficiency of an entire HEV power-train from the chemical energy in the fuel to the mechanical energy at the wheels.

The inventors herein have recognized that, when the electricity is directly transmitted from the first electric machine to the second electric machine, the two energy conversions from electrical through chemical to electrical energies at the battery can be omitted, and the energy conversion efficiency may be improved for the omission of the two conversions. The conversion efficiency from the electrical to mechanical energies at the second electric machine is simply determined from the load and speed for a power transmission mechanism with a fixed gear ratio, which is common on a series HEV. In this situation, for the better overall efficiency, only the efficiencies at the engine and the first electric machine can be improved.

The '702 patent presents a method of operating an engine at an operating point where it operates most efficiently while outputting desired power. In this method, although the engine may operate with the best available efficiency on the desired power, the first electric machine may operate less efficiently at the operating point which has been determined only in consideration for the engine efficiency. Therefore, there is a room to improve the overall efficiency of a series HEV power-train.

SUMMARY

Accordingly, there is provided, in one aspect of the present description, a method of controlling a power-train of a hybrid electric vehicle comprising an internal combustion engine, a first electric machine directly driven by the internal combustion engine for generating electricity, and a second electric machine driven at least partly with the electricity for driving the vehicle wheel. The method comprises adjusting the speed and the torque of the internal combustion engine, while substantially maintaining the intake manifold pressure, in response to a change of the desired electricity from the first electric machine.

According to the method, the higher engine efficiency can be maintained, because the engine intake manifold pressure is maintained during adjusting the engine speed and torque. The engine speed may be adjusted corresponding to a speed of the first electric machine with higher efficiency and the desired output electricity. Alternatively, the engine speed and toque may be adjusted so that a combination of the efficiencies of the engine and the first electric machine is highest for the desired output electricity of the first electric machine. Therefore, in any event, both the engine and the first electric machine may achieve the respective higher efficiencies. Consequently, overall efficiency of a series HEV power-train can be improved.

In a second aspect of the present description, the method comprises adjusting electricity supplied to the second electric machine in response to a change of the desired output from the power-train. The method further comprises adjusting the speed and the torque of the internal combustion engine, while substantially maintaining the intake manifold pressure, in response to the desired power-train output change. According to the method of the second aspect, for the reason previously described above with regard to the first aspect, both the engine and the first electric machine may achieve the respective higher efficiencies. Further, since both the electricity supplied to the second electric machine and the engine speed and torque are adjusted in response to the desire power-train output change, energy conversion may be minimal. Consequently, the overall efficiency of the entire series HEV power-train may be further improved.

In embodiments, the engine speed may be changed by adjusting the engine torque or the electricity generated by the first electric machine. The engine torque may be adjusted by adjusting fuel. While doing this, a valve lift of an intake valve or an exhaust valve may be adjusted for maintaining the engine intake manifold pressure. Also, air fuel ratio of air fuel mixture supplied to the engine, exhaust gas re-circulated to the engine, number of active engine cylinders, or number strokes of an engine cycle may be adjusted for maintaining the engine intake manifold pressure.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
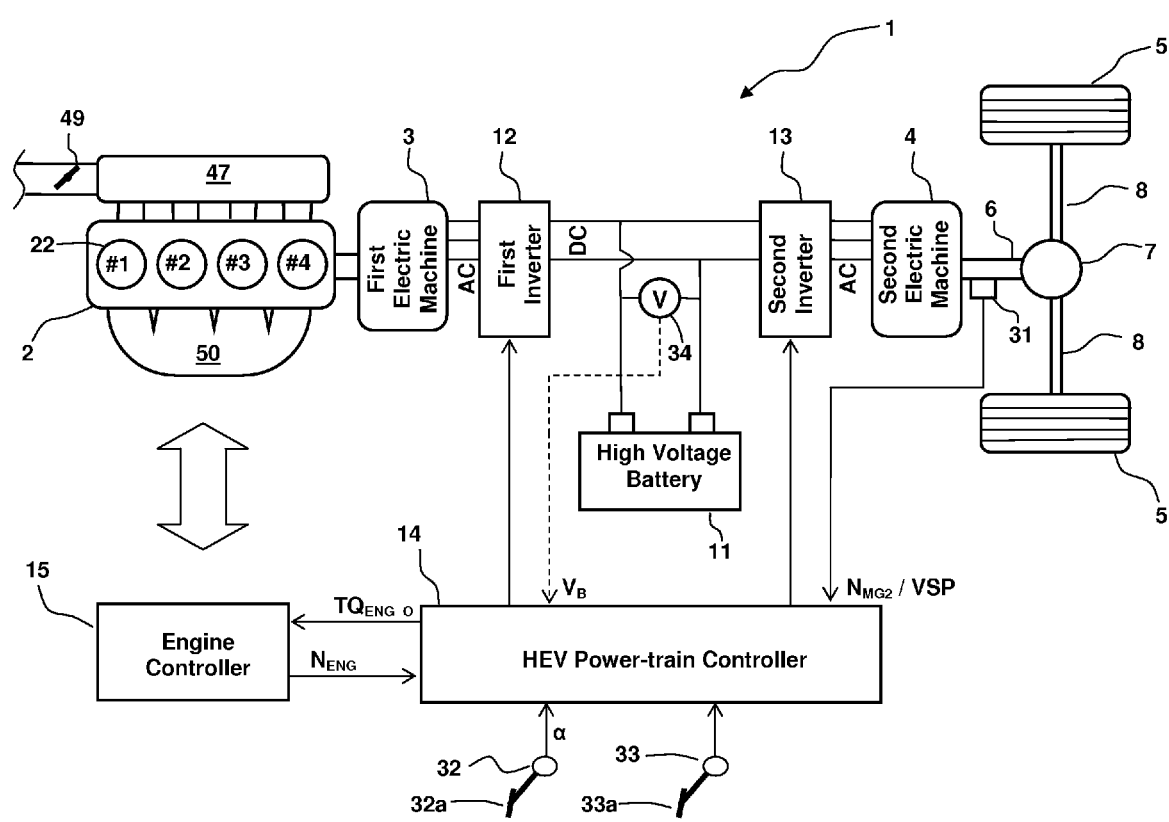
FIG. 1 is a schematic diagram illustrating a series hybrid electric power-train system according to an embodiment of the present description.

Embodiments of the present description will now be described with reference to the drawings, starting with FIG. 1, which illustrates a schematic diagram of an entire system of a series hybrid electric vehicle (HEV) power-train 1. The series HEV power-train 1 comprises an internal combustion engine 2, a first electric machine 3, and a second electric machine 4. A crankshaft 21 of the engine 1 is directly coupled to an input shaft of the first electric machine 3, so that it rotates at a same speed as the engine 1. There is no mechanical connection between the first and second electric machines 3 and 4. Instead, an output shaft of the second electric machine 4 is mechanically coupled to driving wheels 5 through a final drive-train, for example, including a propeller shaft 6, a differential gear set 7 and drive shafts 8, as known in the art. In the illustrated embodiment, the driving wheels 5 are vehicle rear wheels, but they may be vehicle front wheels for front wheel drive vehicles.

The first and second electric machines 3 and 4 are three-phase induction motor generators (MGs) known in the art. They are electrically connected to a high voltage battery 11 through first and second inverters 12 and 13 respectively. The first electric machine 3 rotates, and generates alternate current (AC), which is output through three AC power lines to the first inverter 12. There, the electricity in the form of AC is converted to direct current (DC), and output to DC power lines. When the electricity is supplied to the first electric machine 3 in the opposite direction, it may generate torque to drive the engine 2, such as for an engine start.

The second inverter 13 receives electricity in the form of DC from the DC power lines, and converts the electricity from DC to AC. The second electric machine 4 can generate torque with the AC electricity from the second inverter 13 through three AC power lines, and output the torque to the driving wheels 5 through the final drive-train. Also, such as when the vehicle is decelerating, rotational inertia on the driving wheels 5 can rotate the second electric machine 4, which can generate electricity in the form of AC and output it to the second inverter 13 through the three AC power lines.

The first and second inverters 12 and 13 are connected with each other by the DC power lines, which are respectively connected to positive and negative terminals of the battery 11, so that direct currents can flow in any directions between the three electrical elements in dependence on their terminal voltages.

A HEV controller 14 controls first and second inverters 12 and 13, and eventually the first and second electric machines 3 and 4. Specifically, the HEV controller 14 is a microcomputer based controller having a central processing unit which executes programs using data, memories, such as RAM and ROM, storing the programs and data, and input/output (I/O) bus inputting and outputting electric signals, as is well known in the art. More specifically, the controller 14 computes desired amounts of the respective input/outputs of the first and second electric machines 12 and 13 based on various inputs. The inputs include signals from a speed sensor 31 for detecting a speed $N_{MG2}$ of the second electric machine 4 corresponding to a vehicle speed VSP, an accelerator position sensor 32 for detecting a position a of an accelerator pedal 32a, a brake switch 33 for detecting a depression of a brake pedal 33a by a vehicle operator, a battery voltage sensor 34 for detecting a terminal voltage $V_B$ of the battery 5, first through third current sensors (not shown) for respectively detecting electric currents flowing to/from the first inverter 12, the second inverter 13 and the battery 5, and other sensors. The HEV controller also communicates with an engine controller 15, which is described in greater detail below.

The internal combustion engine 2 has, in the present embodiment, four cylinders 22 (#1 through #4 cylinders in FIG. 1), although it may have any number of cylinders. Referring to FIG. 2 for greater detail, the engine 2 comprises a cylinder block 23, and a cylinder head 24, which is arranged on the cylinder block 23. The cylinder block 23 and cylinder head 24 integrally form the cylinders 22. The cylinder 22 accommodates a piston 25 which slides therein. As is well known in the art, the cylinder block 22 rotationally supports a crankshaft 21 using journals, bearings and the like. Further, a connecting rod 26 links the crankshaft 21 and the piston 25. The cylinder head 24, the cylinder 22, and the piston 25 collectively form a combustion chamber 27 inside.

Figure 2:
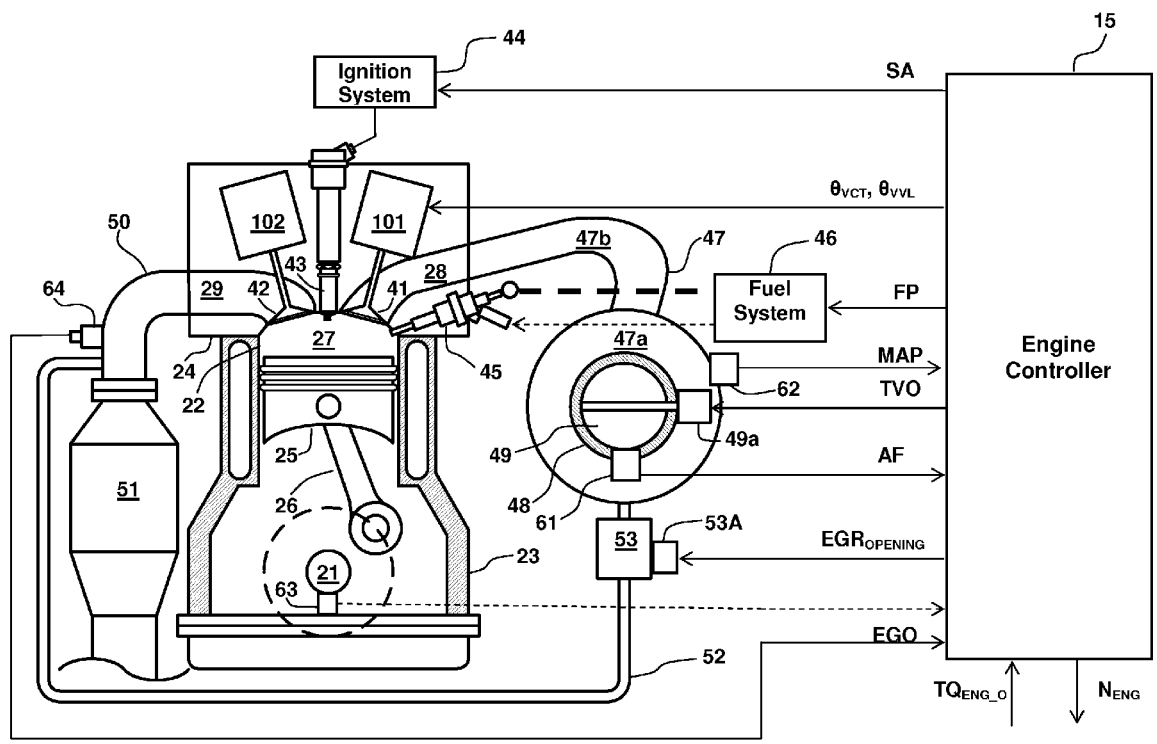
FIG. 2 is a schematic diagram illustrating an internal combustion engine system consisting a part of the series hybrid electric power-train of FIG. 1.

Although only one is illustrated in FIG. 1, two intake ports 28 are formed in the cylinder head 24, and respectively open to the combustion chamber 27. Likewise, two exhaust ports 29 are formed in the cylinder head 23, and respectively open to the combustion chamber 27. Intake valves 41 and exhaust valves 42 are respectively capable of shutting the intake ports 28 and the exhaust ports 29 from the combustion chamber 27 as shown in FIG. 2. A valve drive mechanism 101 causes each of the intake valves 41 to make reciprocating movement at desired timing. Likewise, a valve drive mechanism 102 causes each of the exhaust valves 42 to make a reciprocating movement at desired timing. The valve drive mechanism 101 will be described later in greater detail.

A spark plug 43 is mounted to the cylinder head 24 in the well known manner such as threading. An ignition circuit or system 44 receives a control signal SA from the engine controller 15, and provides electric current to the spark plug 43 so that it makes a spark at desired ignition timing.

A fuel injector 45 is mounted to the cylinder head 24 at one side of a cylinder center axis in a known manner such as using a mounting bracket. A tip end of the injector 45 faces the inside of the combustion chamber 27 from a space vertically below and horizontally between the two intake ports 28. A fuel supply system 46 includes a high pressure pump and an injector driver circuit not shown, and supplies fuel from a fuel tank not shown. Also, the fuel supply system 46, particularly an injector driver circuit therein, activates a solenoid of the injector 45 to open the spray nozzles in accordance with a control signal from the engine controller 15, in order to inject desired amount of fuel at desired timing.

The intake ports 28 connect in fluid communication to a surge tank 47a through intake passages 47b of an intake manifold 47. Air flows from an air cleaner not shown to the surge tank through a throttle body 48, in which a throttle valve 49 is arranged. The throttle valve 49 pivots and regulates airflow to the surge tank 47a, as is well known in the art. A throttle actuator 49a adjusts an opening of the throttle valve 49 in accordance with a control signal TVO from the engine controller 15.

The exhaust ports 29 connect to an exhaust manifold 50, and eventually are in fluid communication with an exhaust pipe in a manner known in the art. Downstream of the exhaust manifold 50 in an exhaust gas passage, an exhaust gas purification system having one or more of catalyst converters 51 is arranged. The catalyst converter 51 may comprise a conventional three way catalyst, a lean NOx trap, an oxidation catalyst or any other type of catalyst that conforms to exhaust gas purification needs of the specific fuel control strategy.

For exhaust gas recirculation, an EGR pipe 52 connects the intake manifold 47, downstream of the throttle valve 49, and the exhaust manifold 50 in fluid communication. Pressure at the exhaust side is higher than at the intake side, so that exhaust gas flows into the intake manifold 47 and mixes with the fresh air inducted from the intake manifold 47 into the combustion chamber 27. An EGR valve 53 is arranged in the EGR pipe 52 and regulates the EGR flow. An EGR valve actuator 53a adjusts an opening of the EGR valve 53 in accordance with a control signal $EGR_{OPENING}$ from the engine controller 15.

Figure 3:
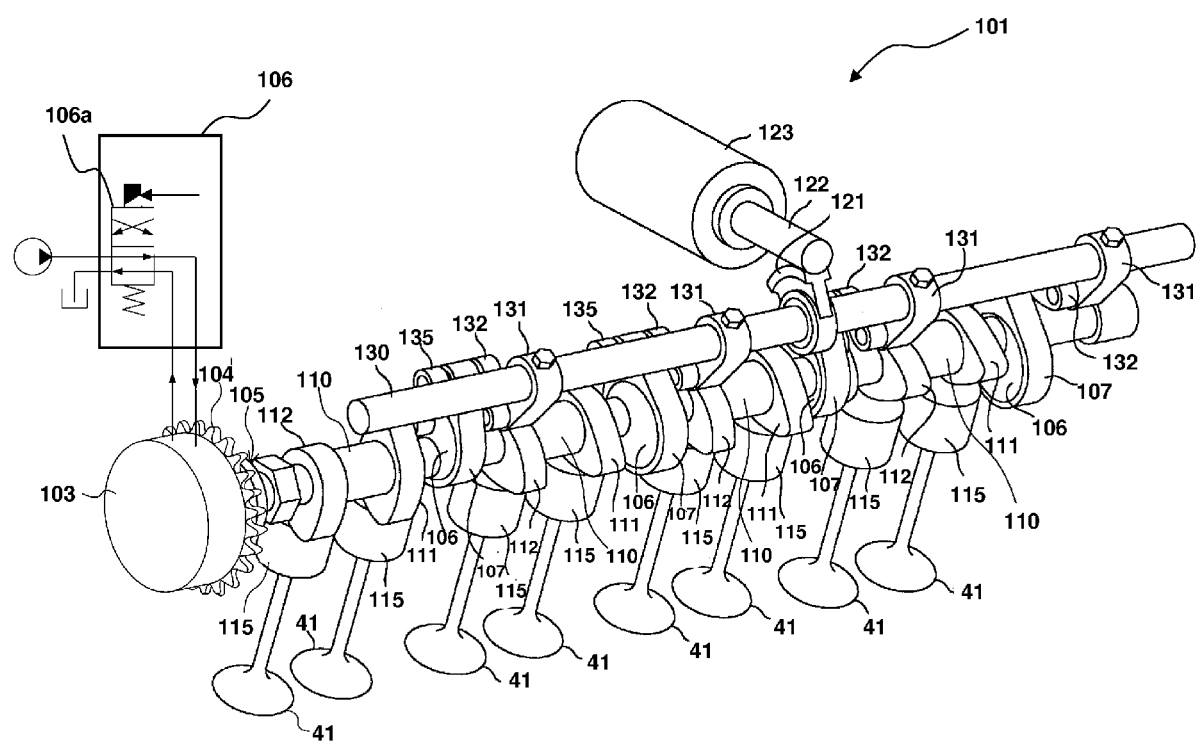
FIG. 3 is a general perspective view of a valve drive mechanism of the engine illustrated in FIG. 2.

Referring to FIG. 3, there is shown the valve drive mechanism 101 for the intake valves 41. The valve drive mechanism 102 for the exhaust valves 42 has a same construction as for the intake in the present embodiment. Therefore the specific description for the mechanism 102 will be omitted. Alternatively, the valve drive mechanism 102 for the exhaust valves may be a conventional overhead camshaft (OHC) type. The OHC type valve drive mechanism comprises a cam for pushing a valve stem, a camshaft integrally forming the cam, and a camshaft drive-train such as belt and sprocket for transmitting rotational movement of the crankshaft 21 to the camshaft, as is well known in the art.

The valve drive mechanism 101 has a variable cam timing (VCT) mechanism 103, which is linked to the crankshaft 21 through a chain drive mechanism including a driven sprocket 104, a drive sprocket at the crankshaft 21, and a chain not shown and engagingly wounded around the drive and driven sprockets. The VCT mechanism 103 comprises a casing, which is affixed to the sprocket 103 to rotate with it, and a rotor, which is affixed to an inner shaft 105 and rotates with it. Between the casing and the rotor of the VCT mechanism 103, there are formed a plurality of hydraulic chambers, which are circumferentially arranged around the rotational axis X (in FIG. 4). Fluid pressurized by a pump, such as engine oil, is selectively supplied to each of the hydraulic chambers to make a pressure difference between the opposing chambers. A VCT control system 106 including an electromagnetic valve 106a adjusts the hydraulic fluid supplied to the chambers. The electromagnetic valve 106a cyclically switches hydraulic acting directions to the chambers in a duty ratio in accordance with a control signal from the engine control unit 15 and an actual phase difference between the sprocket 104 and the inner shaft 105, thereby achieving a desired rotational phase of the inner shaft 105, as is known in the art.

The inner shaft 105 has an eccentric disc-shaped cam 106 for each of the cylinders 22. The eccentric cam 106 is formed integrally but not coaxially with the inner shaft 105, and rotates at a phase defined by the VCT mechanism 103. Freely rotationally fitted around the eccentric disc 106 is an inner surface of a ring arm 107. Therefore, the ring arm 107 can self rotate around the center axis of the eccentric cam 106 and orbit around the rotational axis X (in FIG. 4), as the inner shaft 105 rotates around the rotational axis X.

Figure 4:
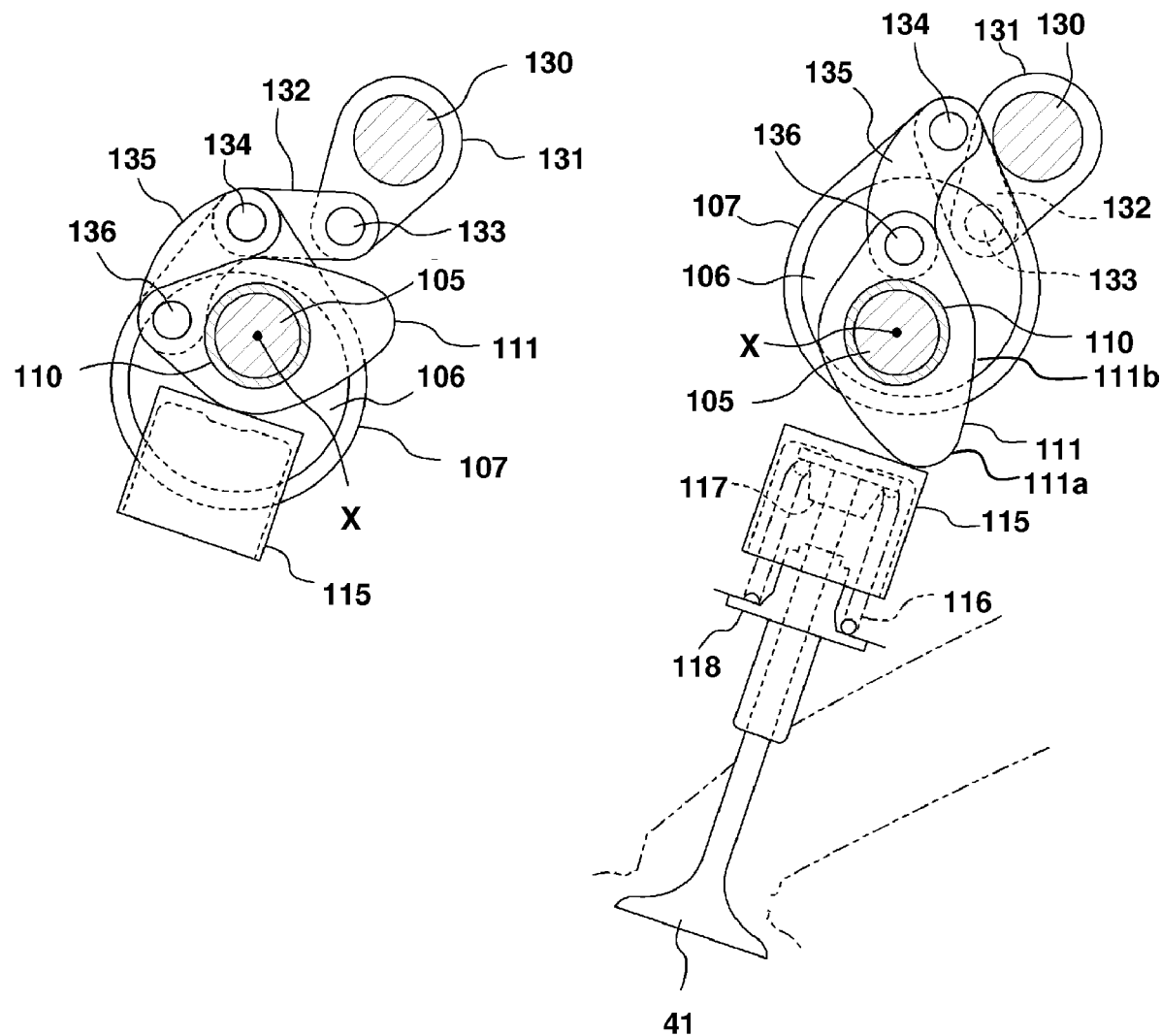
FIG. 4 is side views of a part of the valve drive mechanism illustrated in FIG. 3.

Arranged around the inner shaft 105 is a rocker connector 110 for each of the cylinders 22. The rocker connector 110 pivots coaxially with the inner shaft 105, in other words, around the axis X, and integrally forms first and second rocker cams 111 and 112. The rocker connector 110 forms a bearing journal at its outer circumferential surface, so that a bearing cap not shown arranged on the cylinder head 24 can rotationally support the rocker cam part 110 through 112. As shown in FIG. 4, each of the rocker cams 111 and 112 has a cam surface 111a and a basic circular surface 111b, either of which contacts to an upper surface of tappet 115, as a conventional valve drive cam does, except that the rocker cams do not continuously rotate, but rocks. The tappet 115 is supported by a valve spring 116, which is sustained between retainers 117 and 118, as is known in the art.

Referring back to FIG. 3, arranged above and in parallel with the assembly of inner shaft 105 and the rocker cam parts 110 through 112 is a control shaft 120, which is rotationally supported by bearings not shown. The control shaft 120 integrally forms a worm gear 121 coaxially at its outer peripherally. The worm gear 121 engages with a worm 122, which is affixed to an output shaft of an electric motor of a variable valve lift (VVL) actuator 125. Therefore, the motor 125 may rotate the control shaft 120 to its desired position, in accordance with a control signal from the engine controller 15.

Four control arms 131 for the respective cylinders 22 are attached to the control shaft 120, so that the control arms 131 can pivot integrally with the control shaft 120. A control link 132 couples each of the control arms 131 and the respective ring arm 107 through a control pivot 133 and a common pivot 134. Then, a rocker link 135 couples the ring arm 107 and the first cam 107 through the common pivot 134 and a rocking pivot 136.

As shown in FIG. 4, when the inner shaft 105 rotates and the eccentric cam 106 is in a lower position as illustrated in the left, the ring arm 107 is in a lower position. On the other hand, when the eccentric cam 106 is in an upper position as illustrated in the right for the same position of the control arm 121, the ring arm 107 is in an upper position. A position of the common pivot 134 is defined by positions of the control pivot 133 and the common center of the eccentric disc cam 106 and the ring arm 107 in a three-link relationship. Therefore, if the control pivot 133, or in other words, the control arm 121 does not move, the common pivot 134 reciprocally moves solely depending on the rotational movement of the common center of the eccentric disc cam 106 and the ring arm 107. Then, the reciprocal movement of the common pivot 134 is transmitted to the first rocker cam 111 through the rocker arm 135, so that the first and second rocker cams 111 and 112 reciprocally rock around the axis X. Consequently, the reciprocally rocking movement of the rocker cam 111 or 112 causes its cam surface 111a to push down the tappet 115 against the valve spring 116, when the cam surface 111a contacts the tappet 115. Then, the tappet 115 causes the intake valve 41 to open the intake port 28. On the other hand, when the basic circular surface 111b contacts the tappet 115, it is not pushed down, because the basic circular surface 1111b has a constant radius smaller than a distance between a point of the cam surface 111a and the axis X.

In the aforementioned three-link relationship between the control pivot 133, the common pivot 133, and the common center of the eccentric disc cam 106 and the ring arm 107, if the control pivot 133 is moved by rotating the control shaft 120 and the control arm 121 with the motor 123, the common pivot 134 makes a different reciprocal movement, since the fixed pivot of the three link relationship is moved. Therefore, by adjusting an angular position of the control pivot 133, the reciprocal movement of the rocker cam 111 or 112 will be changed. Specifically, for example, when the control arm 121 is rotated clockwise; and the control pivot 133 is displaced to the left from the position shown in FIG. 4, the range of the reciprocal movement of the rocker cam 111 is shifted to a range where the basic circular surface 111b more tends to contact to the tappet 115. When the reciprocal movement of the rocker cam 111 is shifted to a greater extent, only the basic circular surface 111b may contact to the tappet 115 without any contact of the cam surface, a valve lift may become zero, and a valve actuation may be disabled.

Therefore, the valve drive mechanism 101 can vary a phase of valve timing with the VCT mechanism 103 and the related components, and also can vary a valve lift from zero to a maximum with the VCT actuator 123 and the related components. Therefore, it may enable any combination of valve opening timing and closing timing.

The engine controller 15 is a microcomputer based controller having a central processing unit which runs programs using data, memories, such as RAM and ROM, storing the programs and data, and input/output (I/O) bus inputting and outputting electric signals, as is well known in the art. In the present embodiment, as shown in FIG. 1, the engine controller 15 is a separate unit from the HEV controller 14. But, the two controllers may be integrated into a single unit. As shown in FIG. 2, the engine controller 15 receives various inputs including an airflow AF from a mass airflow meter 61, an intake manifold pressure MAP from an intake air pressure sensor 62, a crank angle pulse signal from a crank angle sensor 63, based on which an engine speed $N_{ENG}$ is computed, an oxygen concentration EGO in the exhaust gas from an exhaust gas oxygen sensor 64, and other sensors as is known in the art. In addition to the conventional inputs, the engine controller 15 receives an operating engine torque signal $TQ_{ENG\_O}$ from the HEV controller 14. On the other hand, the engine controller 15 outputs the computed engine speed $N_{ENG}$ to the HEV controller 14.

The engine controller 15 computes operating parameters for the actuators, for example, including the throttle actuator 49a, the fuel injectors 45, the ignition system 44, the valve drive mechanism 101 and the EGR valve actuator 52A, in accordance with the inputs described above. Then, the controller 15 outputs control signals, for example, including the desired throttle position signal TVO, the fuel injection pulse FP, the cam timing and valve lift signals $\theta_{VCT}$ and $\theta_{VVL}$, and the EGR valve opening $EGR_{OPEN}$.

Control in HEV Controller

The HEV controller 14 controls the overall HEV powertrain 1. It directly controls the first and second inverters 12 and 13, and indirectly controls the engine 2 through the engine controller 15.

Figure 5:
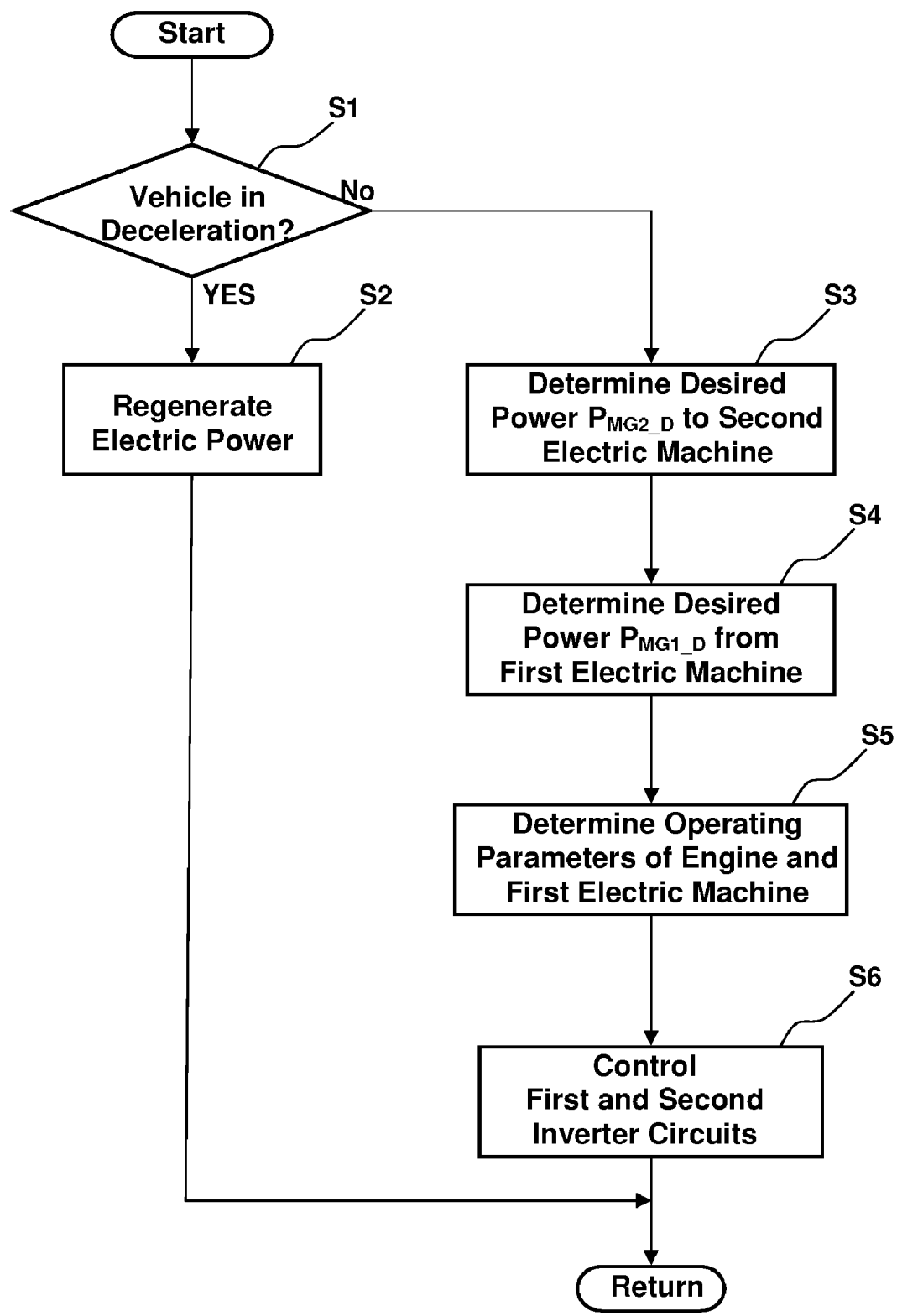
FIG. 5 is a flowchart showing a main control routine of a HEV power-train controller shown in FIG. 1 according to the embodiment of the present description.

Referring to FIG. 5, there is shown a flowchart of a main control routine of a computer program stored in the memory of and processed by the HEV controller 14. After the start, the routine determines whether the vehicle is in deceleration or not at a step S1. This determination may be done, for example, by determining whether the accelerator position α is zero and the brake pedal 33a is depressed. If it is determined that the vehicle is in deceleration (YES) at the step S1, the routine proceeds to a step S2 and runs a power regeneration control routine. In the power regeneration control, the second electric machine 4 generates electricity and supplies it to the battery 11, as is known in the art. After the step S2, the routine returns.

If it is determined that the vehicle is not in deceleration (NO) at the step S1, the routine proceeds to a step S3 and determines a desired power $P_{MG2\_D}$ to be input to the second electric machine 4, as described in greater detail later with reference to a routine R1 in a flowchart of FIG. 6. Then, the main routine proceeds to a step S4, and determines a desired electric power $P_{MG1\_D}$ to be output from the first electric machine 3, as described later with reference to a routine R2 illustrated by a flowchart of FIG. 7. After the step S4, the main routine proceeds to a step S5, and determines operating parameters for the engine 2 and the first electric machine 3 at least based on the desired electric power $P_{MG1\_D}$ determined at the step S3, as described later with reference to a routine R3 illustrated by a flowchart of FIG. 8.

After the step S5, the main routine proceeds to a step S6, and the HEV controller 14 controls the first inverter circuit 12 and the second inverter circuit 13 to operate the first and electric machines 3 and 4 with the operating parameters determined at the steps S3 and S5. Then, the main routine returns.

Figure 6:
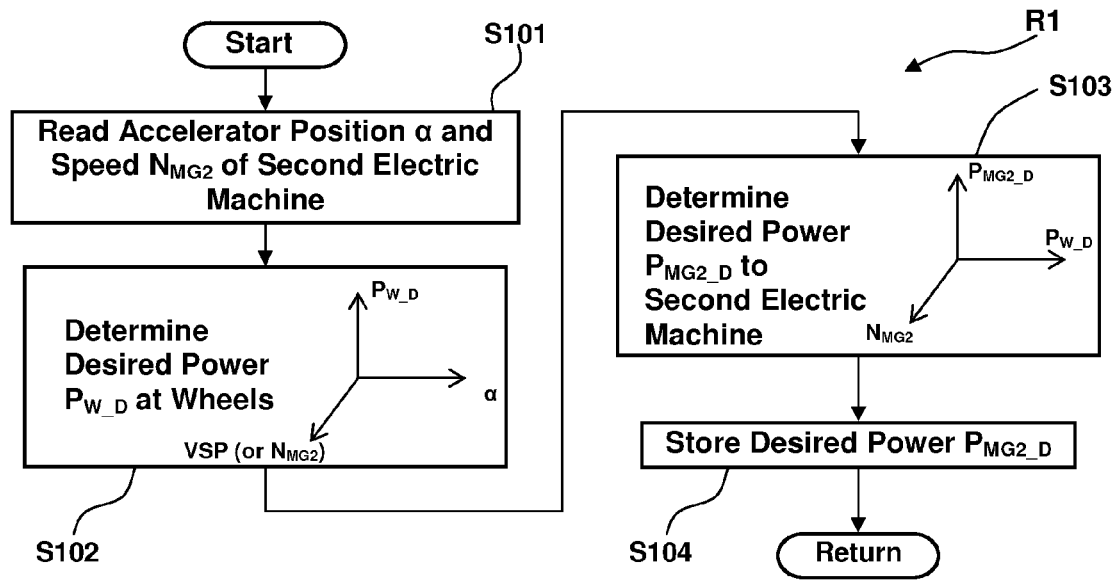
FIG. 6 is a flowchart showing a control routine R1 executed at a step S3 of the main routine of the HEV power-train controller shown in FIG. 5.

There is shown, in FIG. 6, the routine R1, which runs at the step S3 of the main routine to determine the desired power $P_{MG2\_D}$ to the second electric machine 4. After the start, the routine R1 proceeds to a step S101, and reads an accelerator opening α from the accelerator pedal sensor 32 and a speed $N_{MG2}$ of the second electric machine 3 from the speed sensor 31. Then, it proceeds to a step S102, and determines a desired power $P_{W\_D}$ at the wheels 5 by referring to a $P_{W\_D}$ map or table stored in the HEV controller 16. The $P_{W\_D}$ map is defined by the accelerator position α, and the vehicle speed VSP corresponding to the read speed $N_{MG2}$, because of the fixed gear ratio of the drive-train described above. The desired power $P_{W\_D}$ is generally in proportion with the accelerator position α, but is modified in accordance with the vehicle speed VSP considering a specific situation at a given vehicle speed. For example, in a lower VSP and smaller α condition, the desired power $P_{W\_D}$ may be set a relatively smaller value compared to that at a higher VSP and the same α for better maneuverability at a lower speed, such as in a parking garage. Also, it may be modified depending on a change of accelerator position a for a better acceleration performance and a occupant comfort in cruising. When a cruise control unit not shown is turned on, a signal from the cruise control unit may be input to the HEV controller 14, and it may substitute for the accelerator position a at the step S101.

Then, the routine R1 proceeds to a step S103, and determines desired electric power $P_{MG2\_D}$ to be input to the second electric machine 4, by referring to a $P_{MG2\_D}$ map or table stored in the memory of the HEV controller 14. A relation between the desired power $P_{W\_D}$ and the desired electric power $P_{MG2\_D}$ can be expressed by the following equation:

$$P_{W\_D} = P_{MG2\_D} * \eta_{MG2} * \eta_{MECH}$$

or $$P_{MG2\_D} = P_{W\_D} / (\eta_{MG2} * \eta_{MECH})$$

Where $\eta_{MG2}$ is a coefficient of conversion efficiency from electrical to mechanical power at the second electric machine 4, and is a function of its speed $N_{MG2}$ and its load. And, $\eta_{MECH}$ is a coefficient of power transmission efficiency between the second electric machine 4 and the driving wheels 5, which is lowered due to a friction loss on the drive-train, and is a function of the vehicle speed VSP, and torque or load transmitted. As described above, the speed $N_{MG2}$ of the second electric machine 4 corresponds to the vehicle speed VSP, and the load is a function of power and speed, actually obtained by subtracting the power by the speed. Therefore, the desired electric power $P_{MG2\_D}$ is a function of the desired power $P_{W\_D}$ at the wheels 5, and the speed $N_{MG2}$. Then, after storing the desired electric power $P_{MG2\_D}$ at a step S104 in the memory for a use at the step S4 of the main routine, the routine R1 returns.

Figure 7:
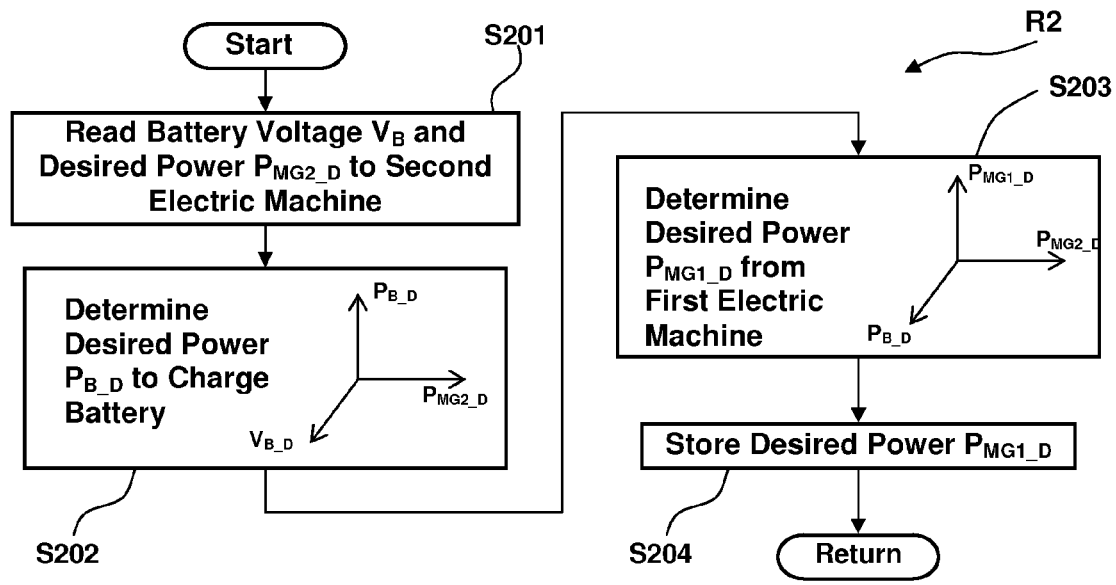
FIG. 7 is a flowchart showing a control routine R2 executed at a step S4 of the main routine shown in FIG. 5.

Referring to FIG. 7, there is shown a routine R2, which runs at the step S4 of the main routine to determine the desired electric power $P_{MG1\_D}$ to be output from the first electric machine 3. After the start, the routine R2 proceeds to a step S201, and reads a terminal voltage $V_B$ from the battery voltage sensor 34, and the desired electric power to the second electric machine ($P_{MG2\_D}$) stored at the step S104 from the memory of the HEV controller 14. Then, it proceeds to a step S202, and determines a desired electric power $P_{B\_D}$ to be charged to the battery 5, by referring to a $P_{B\_D}$ map or table. The electric power $P_{B\_D}$ may be defined by a function of the battery voltage $V_B$, so as to maintain a predetermined desired voltage $V_{B\_D}$, which may be corresponding to, for example, 75% of full charge capacity of the battery 11. Also, it may be a function of the desired electric power $P_{MG2\_D}$, because the battery 11 may not be charged when the second electric machine 4 needs greater amount of electricity or power. Therefore, in the $P_{B\_D}$ map, the desired power $P_{B\_D}$ to charge the battery 5 may be mapped on the battery voltage $V_B$ and the desired power $P_{MG2\_D}$ to the second electric machine 4.

After determining the desired battery charging power $P_{B\_D}$ at the step S202, the step R2 proceeds to a step S203, and determines the desired electric power $P_{MG1\_D}$ to be output from the first electric machine 3, by referring to a $P_{MG1\_D}$ map or table, stored in the memory of the HEV controller 14. The desired electric power $P_{MG1\_D}$ is approximately equal to a sum of the desired battery charging power $P_{B\_D}$ and the desired second electric machine driving power $P_{MG2\_D}$. In the present embodiment, considering that electric transmission efficiency between the electric components will vary depending on the amount of transmitted electricity, in the $P_{MG1\_D}$ map, the desired electric power $P_{MG1\_D}$ from the first electric machine 3 is mapped on the desired electric power $P_{MG2\_D}$ to the second electric machine 4 and the desired electric power $P_{B\_D}$ to the battery 11. Then, after storing the desired electric power $P_{MG1\_D}$ as well as the desired electric power $P_{B\_D}$ to charge the battery 11 at a step S204 in the memory for a use at the step S5 of the main routine, the routine R2 returns.

Figure 8:
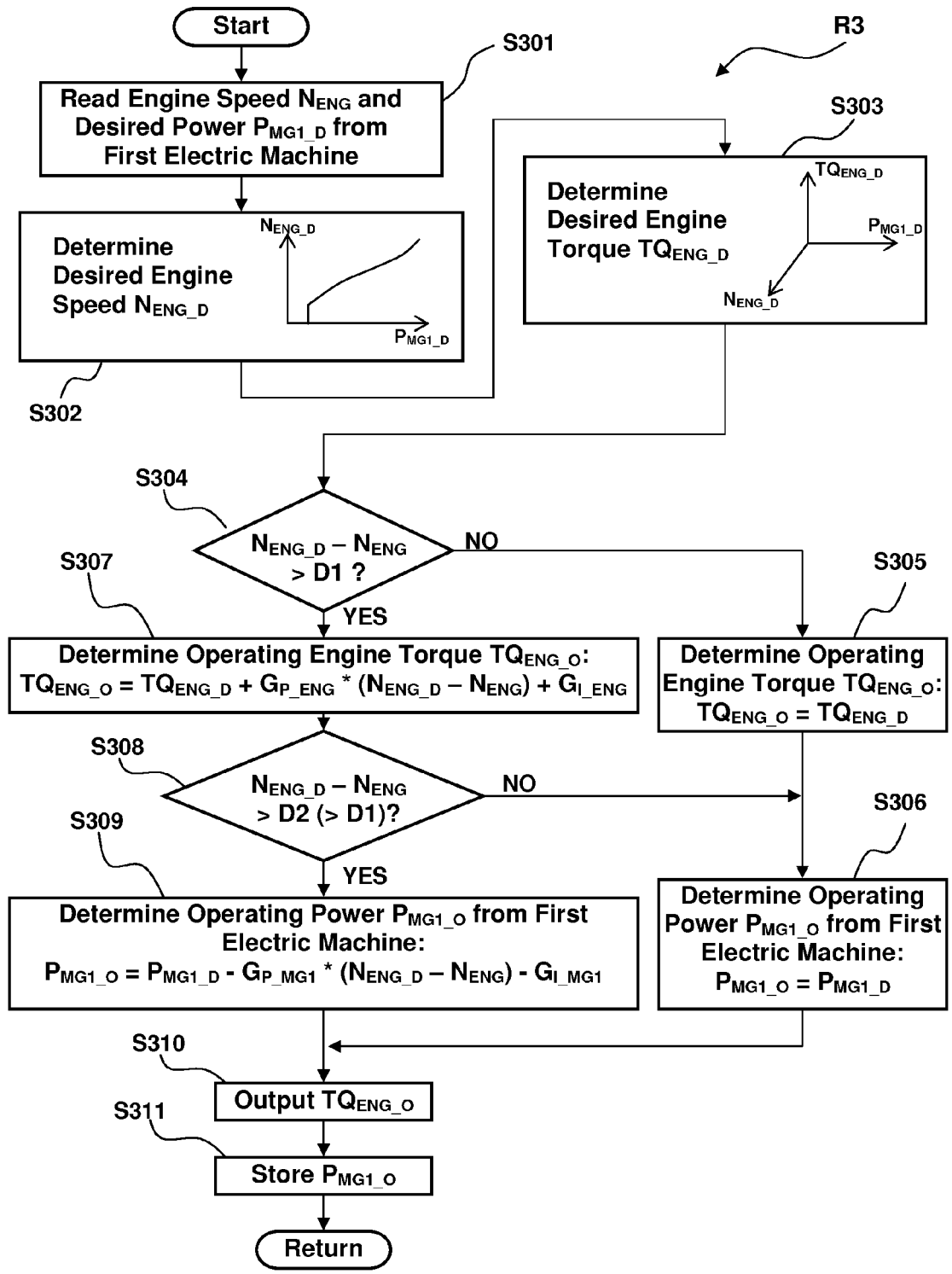
FIG. 8 is a flowchart showing a control routine R3 executed at a step S5 of the main routine shown in FIG. 5.

Referring to FIG. 8, there is shown a routine R3, which runs at the step S5 of the main routine to determine an operating point of the engine 2 and the first electric machine 3. After the start, the routine R3 proceeds to a step S301, and reads an engine speed $N_{ENG}$ from the crank angle sensor 63 through the engine controller 15, and the desired electric power $P_{MG1\_D}$ stored in the memory of the HEV controller 14 at the step S204 of the routine R2. Then, the routine R3 proceeds to a step S302, and determines a desired engine speed $N_{ENG\_D}$, by referring to a $N_{ENG\_D}$ table. The $N_{ENG\_D}$ table stores data sets, each of which contains a desired engine speed $N_{ENG\_D}$ and a desired electric power $P_{MG1\_D}$. As described in greater detail below, at the desired engine speed $N_{ENG\_D}$, the engine 2 and the first electric machine 3 collectively operate most efficiently for the desired electric power $P_{MG1\_D}$. Then, the routine R3 proceeds to a step S303, and determines a desired engine torque $TQ_{ENG\_D}$, by referring to a $TQ_{ENG\_D}$ map or table. The relationship between the desired first electric machine power $P_{MG1\_D}$, the desired engine speed $N_{ENG\_D}$, and the desired engine torque $TQ_{ENG\_D}$ can be expressed by the following equation:

$$P_{MG1\_D} = P_{ENG\_D} * \eta_{MG1}$$
$$= N_{ENG\_D} * TQ_{ENG\_D} * \eta_{MG1}$$

Or, $$TQ_{ENG\_D} = P_{MG1\_D} / (N_{ENG\_D} * \eta_{MG1})$$

Where $P_{ENG\_D}$ is a desired engine power, which is a product of $N_{ENG\_D}$ and $TQ_{ENG\_D}$, as will be understood, and $\eta_{MG1}$ is a coefficient of conversion efficiency from mechanical to electric energy at the first electric machine 3. The efficiency coefficient $\eta_{MG1}$ of the first electric machine 3 is a function of its speed and load, in other words, corresponds to the engine speed $N_{ENG\_D}$ and the desired power $P_{MG1\_D}$. Therefore, the desired torque $TQ_{ENG\_D}$ is a function of the desired engine speed $N_{ENG\_D}$ and the desired power $P_{MG1\_D}$, as can be understood from the above equation. Therefore, in the present embodiment, the desired torque $TQ_{ENG\_D}$ is mapped, in the $TQ_{ENG\_D}$ map, on the desired engine speed $N_{ENG\_D}$ and the desired power $P_{MG1\_D}$.

After determining the desired torque $TQ_{ENG\_D}$ at the step S303, the routine R3 proceeds to a step S304, and determines whether a difference between the desired engine speed $N_{ENG\_D}$ and the actual engine speed $N_{ENG}$ is greater than a first predetermined speed difference D1 or not. If it is determined NO at the step S304, the actual engine speed $N_{ENG}$ is in the proximity of the desired engine speed $N_{ENG\_D}$. Then, the routine R3 proceeds to a step S305, and an operating engine torque $TQ_{ENG\_O}$ is set to be equal to the desired engine torque $TQ_{ENG\_D}$ determined at the step S303. And, it proceeds to a step S306, where an operating power $P_{MG1\_O}$ to be output from the first electric machine 3 is set to be equal to the desired power $P_{MG1\_D}$ read at the step S301.

If it is determined that a difference between the desired engine speed $N_{ENG\_D}$ and the actual engine speed $N_{ENG}$ is greater than the first predetermined difference D1 (YES) at the step S304, the routine R3 proceeds to a step S307, and the operating engine torque $TQ_{ENG\_O}$ is computed in accordance with the following equation:

$$TQ_{ENG\_O} = TQ_{ENG\_D} + G_{P\_ENG} * (N_{ENG\_D} - N_{ENG}) + G_{I\_ENG}$$

Where $G_{P\_ENG}$ is a proportional feedback gain, that is greater than zero, and $G_{I\_ENG}$ is an integral feedback gain for an engine speed feedback control, that is also greater than zero, while these gains may be constant or variable. By adjusting the operating engine torque $TQ_{ENG\_O}$, an actual engine speed $N_{ENG}$ will be feedback controlled to be a desired engine speed $N_{ENG\_D}$. This feedback control by the engine torque enables the engine speed to change at a rate depending on the engine speed difference.

After the operating engine torque $TQ_{ENG\_O}$ is determined at the step S307, the routine R3 proceeds to a step S308, and determines whether the a difference between the desired engine speed $N_{ENG\_D}$ and the actual engine speed $N_{ENG}$ is greater than a second predetermined speed difference D2 or not. The speed difference D2 is set greater than the first speed difference D1. If it is determined NO at the step S308, the routine R3 proceeds to a step S306, and sets an operating power $P_{MG1\_O}$ to be output from the first electric machine 3 to be the desired power $P_{MG1\_D}$ read at the step S301.

If it is determined at the step S308 that the engine speed difference is greater than the second predetermined difference D2, the speed difference is too great to be compensated only by the engine torque feedback control. Then, the routine R3 proceeds to a step S309, and the operating power $P_{MG1\_O}$ to be output from the first electric machine 3 is computed in accordance with the following equation:

$$P_{MG1\_O} = P_{MG1\_D} - G_{P\_MG1} * (N_{ENG\_D} - N_{ENG}) - G_{I\_MG1}$$

Where $G_{P\_MG1}$ is a proportional feedback gain, that is greater than zero, and $G_{I\_ENG}$ is an integral feedback gain, that is also greater than zero, for an engine speed feedback control while these gains may be constant or variable. By adjusting the operating power $P_{MG1\_O}$, the load on the engine 2 is variably reduced, and an actual engine speed $N_{ENG}$ will be feedback controlled to be a desired engine speed $N_{ENG\_D}$. In addition to the feedback control by the engine torque at the step S306, the power to be output from the first electric machine 3, which is directly coupled to the engine, is reduced. Therefore, the engine speed may be quickly raised to the desired engine speed $N_{ENG\_D}$, even when the difference between the desired and actual speeds is greater.

Then, the routine R3 proceeds to a step S310, and the HEV controller 14 outputs the operating engine torque $TQ_{ENG\_O}$, which is determined at the step S305 or S307, to the engine controller 15. Finally, the routine R3 proceeds to a step S311, and stores the operating power $P_{MG1\_O}$, which is determined at the step S306 or S308, into the memory of the HEV controller 14. Then, the routine R3 returns.

Figure 9:
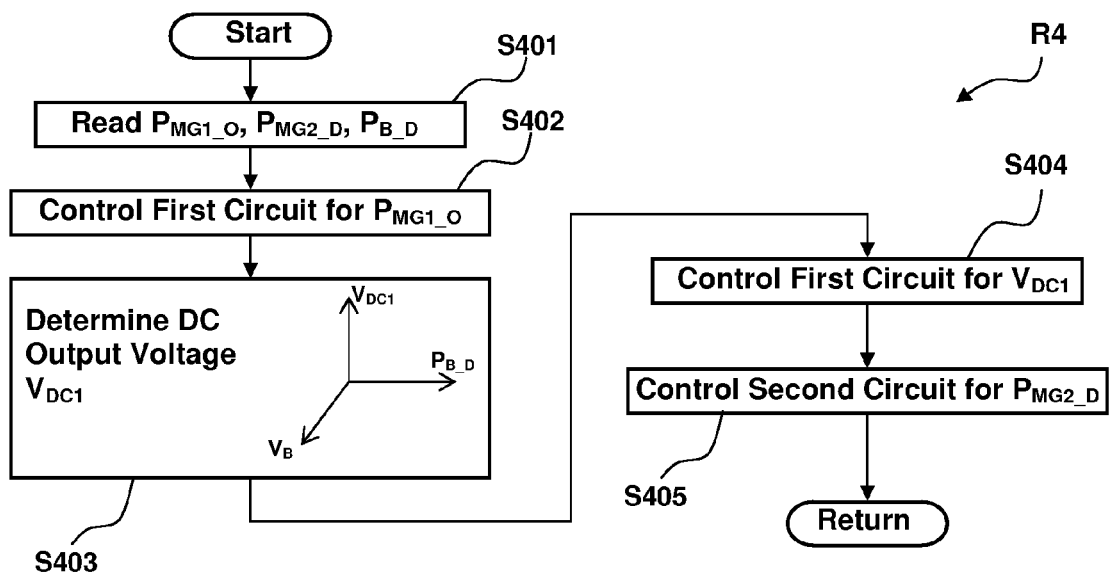
FIG. 9 is a flowchart showing a control routine R4 executed at a step S6 of the main routine shown in FIG. 5.

There is shown, in FIG. 9, the routine R4, which runs at the step S6 of the main routine to control the first and second inverters 12 and 13. After the start, the routine R4 proceeds to a step S401, and reads the operating electric power $P_{MG1\_O}$ to be output from the first electric machine 3, which is stored in the memory of the HEV controller 14 at the step S311 of the routine R3, the desired electric power $P_{MG2\_D}$ to be input to the second electric machine 4, which is stored in the memory at the step S104 or the routine R1, the desired electric power $P_{B\_D}$ to charge the battery 11, and an actual battery voltage $V_B$ detected by the voltage sensor 34. Then, the routine R4 proceeds to the step S402, and the HEV controller 14 controls the first inverter circuit 12 to adjust the electric power output from the first electric machine 3 to be the operating electric power $P_{MG1\_O}$ by adjusting a magnetic field current applied to the first electric machine 3.

The routine R4 proceeds to a step S403, and determines a DC voltage $V_{DC1}$ output from the first inverter circuit 12 in accordance with the desired electric power $P_{B\_D}$ to charge the battery 11. Specifically, the HEV controller 14 determines the voltage $V_{DC}$ based on the desired electric power $P_{B\_D}$ and the actual battery voltage $V_B$. For example, when the desired power $P_{B\_D}$ is zero, in other words, when the battery 11 does not need to be charged, the DC voltage $V_{DC}$ is set equal to the actual battery voltage $V_B$, so that all of the direct current from the first inverter circuit flows to the second inverter circuit 13 for driving the second electric machine 4. When the $V_{DC}$ is higher than the $V_B$, the battery 11 is charged by some portion of the electric power from the first electric machine, the portion depending on the voltage difference between $V_{DC}$ and $V_B$, and the rest of the electric power flows into the second inverter circuit 13.

The routine R4 proceeds to a step S404, and the HEV controller 14 controls the first inverter circuit 12 to convert the AC electric power from the first electric machine 3 and output the DC electricity at the voltage $V_{DC}$ determined at the step S403. Finally, it proceeds to a step S405, and the HEV controller 14 controls the second inverter circuit 13 to supply the desired electric power $P_{MG2\_D}$ to the second electric machine 4 by adjusting a magnetic field current applied to the second electric machine 4. Then, the routine R4 returns, and also the main control routine of the HEV controller 14 illustrated in FIG. 5 also returns.

Although, in the present embodiment, the routines R1 through R4 are described to be processed in sequence of the order of the steps S3 through S6 of the main routine in FIG. 5, the routines may be processed in any sequence, or in parallel.

Control in Engine Controller

Figure 10:
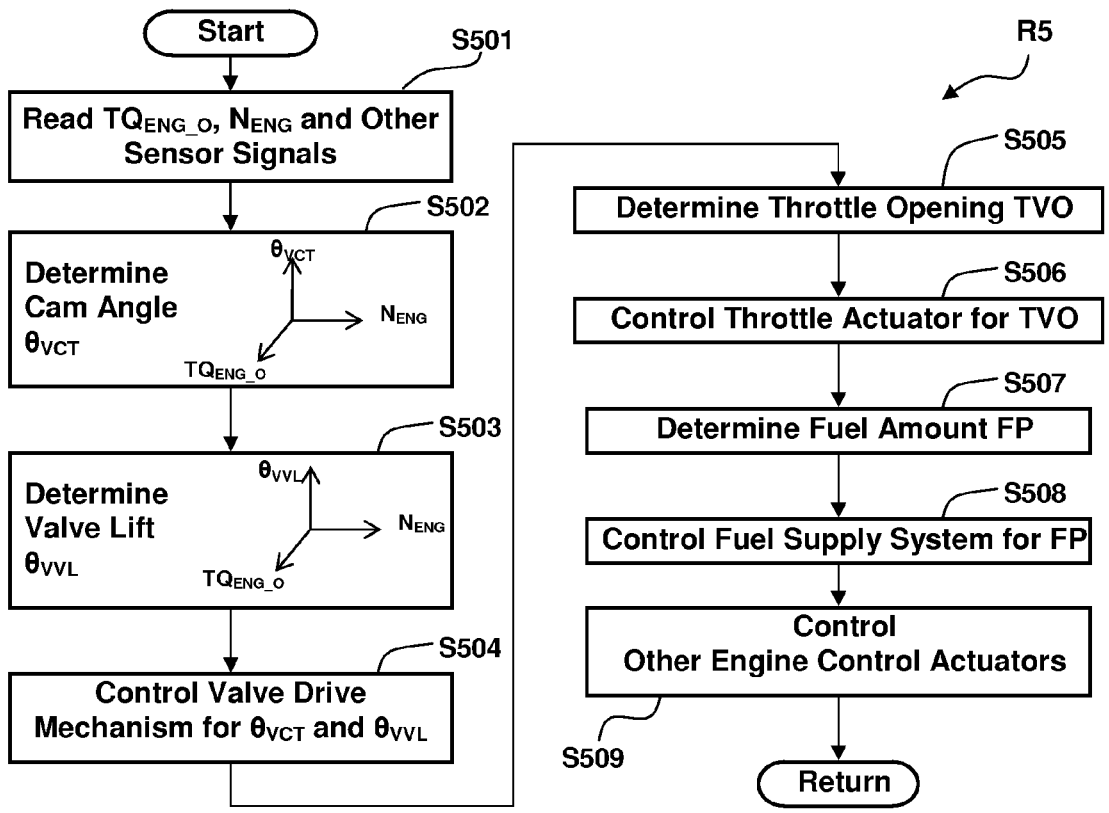
FIG. 10 is a flowchart showing a control routine R5 executed by an engine controller shown in FIGS. 1 and 2, according to the embodiment of the present description.

The engine controller 15 controls the engine 2 by adjusting engine operating parameters in accordance with the operating engine torque $TQ_{ENG\_O}$ input from the HEV controller 14 at the step S310 of the routine R3. Referring to FIG. 10, there is shown a flowchart of a control routine executed by the engine controller 15.

After the start, the routine R5 proceeds to a step S501, and reads an operating engine torque $TQ_{ENG\_O}$ from the HEV controller 14, an engine speed $N_{ENG}$ from the crank angle sensor 63, and other sensor signals described above. Then, the routine R5 proceeds to a step S502, and determines a cam angle $\theta_{VCT}$ for the intake valve drive mechanism 101 by referring to a $\theta_{VCT}$ map or table, where the cam angle $\theta_{VCT}$ is mapped on the operating engine torque $TQ_{ENG\_O}$ and the engine speed $N_{ENG}$, for example, such that the cam angle is advanced as the engine torque $TQ_{ENG\_O}$ is smaller.

At the next step S503, the routine R5 determines a valve lift $\theta_{VVL}$ for the valve drive mechanism 101 by referring to a $\theta_{VVL}$ map or table, where the valve lift $\theta_{VVL}$ is mapped on the operating engine torque $TQ_{ENG\_O}$ and the engine speed $N_{ENG}$, for example, such that a valve lift is smaller as the operating engine torque $TQ_{ENG\_O}$ is smaller. Then, the routine R5 proceeds to a step S504, and the engine controller 15 controls the VCT actuator 106 to adjust the inner shaft 105 at a phase difference from the crankshaft 21 corresponding to the determined cam angle $\theta_{VCT}$, and the VVL actuator 123 to adjust the control shaft 120 at an angular position corresponding to the determined lift $\theta_{VVL}$.

At the next step S504, the routine R5 determines an opening TVO of the throttle valve 49a to be fully opened (100%) unless any particular need to decrease a pressure in the intake manifold 47 arises. Such a need may include more actively re-circulating exhaust gas into the intake airflow by decreasing the intake manifold pressure compared to the exhaust manifold 48 in addition to opening the EGR valve 52. Then, the routine R5 proceeds to a step S506, and the engine controller 15 controls the throttle actuator 49a to adjust an opening of the throttle valve 49 to be the TVO determined at the step S505.

At the next step S507, the routine R5 determines a fuel amount FP for the fuel injector 45 to inject based on the airflow rate AF detected by the airflow meter 61 or the intake manifold pressure MAP detected by the intake air pressure sensor 62 and the engine speed $N_{ENG}$, so that air fuel ratio of air fuel mixture in the combustion chamber 27 is substantially stoichiometric for the specific fuel to be injected. Also for this determination of the fuel amount FP, an exhaust gas oxygen concentration EGO from the exhaust gas oxygen sensor 64 and an exhaust gas recirculation rate from the control signal EGR to the EGR actuator 52A are also taken into account of. Although those adjustments are made, the fuel amount FP is basically in proportion to the engine operating torque $TQ_{ENG\_O}$, because the airflow rate AF is a result of controlling the valve drive mechanism 101 based on the operating torque $TQ_{ENG\_O}$, and the air fuel ratio is substantially constant at the stoichiometric. Then, the routine R5 proceeds to a step S508, and the engine controller 15 controls the fuel supply system 46 to supply the amount of fuel FP through the injector 45 to the engine 2. Finally at a step S509, the routine R5 determines fuel injection timing, ignition timing and other engine operating parameters, and controls the respective actuators for the determined parameters. Then, the routine R5 returns.

Figure 11:
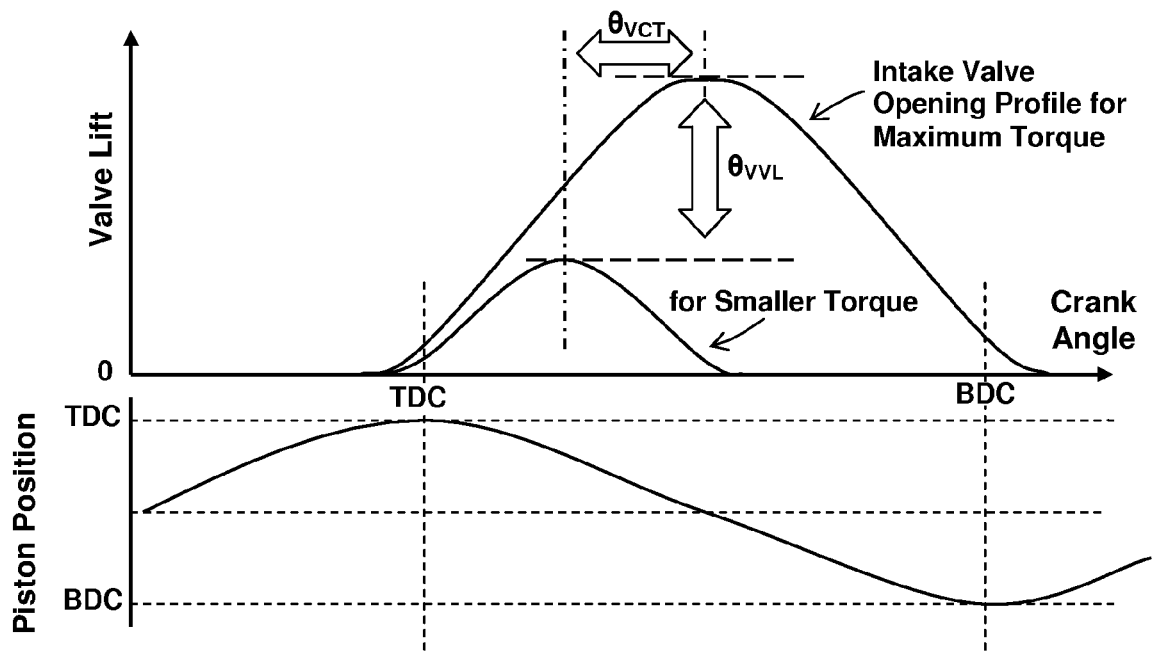
FIG. 11 is a diagram showing opening profiles of valve lift of the intake valve according to the embodiment of the present description.

FIG. 11 illustrates one example of change of operation of the intake valve 41 caused by the routine R5, particularly the steps S502 through S504. As can be seen in FIG. 11, a crank angle of a peak valve lift varies corresponding to a change of the value $\theta_{VCT}$, and the peak valve lift varies corresponding to a change of the value $\theta_{VVL}$. It also can be seen that intake valve closing timing is advanced before a bottom dead center (BDC) of an intake stroke of a four stroke engine cycle as the torque $TQ_{ENG\_O}$ is less, while intake valve opening timing is substantially constant to be just before a top dead center (TDC) of the intake stroke. Therefore, when the demanded torque is smaller, the intake valve 42 closes earlier before the bottom dead center, or in the midst of the descending motion of the piston 25, and air mass inducted into the cylinder 22 can be defined by a position of the piston 25 or the crank angle when the intake valve 42 closes. At the same time, the throttle valve 49 is substantially fully opened at the steps S505 and S506, and the intake air is not throttled, and maintains the pressure in the intake manifold 47 and causes substantially no pumping loss of the engine 2.

Efficiency of the Engine and the First Electric Machine

Figure 12:
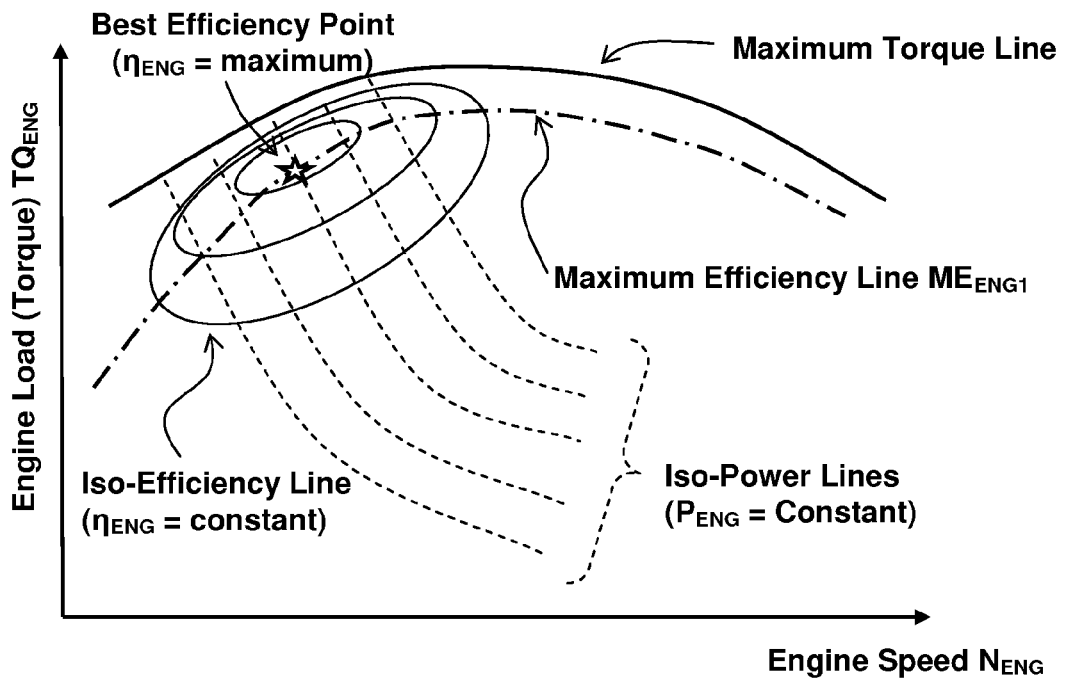
FIG. 12 is a diagram showing performance and efficiency of a conventional internal combustion engine with throttle valve control.

FIG. 12 shows an engine performance and efficiency diagram in a case that the valve driving mechanism 101 operates at fixed timing and lift, and the throttle valve 49 throttles airflow to the engine 1 which generates an engine torque $TQ_{ENG}$ at a speed $N_{ENG}$ and at the stoichiometric air fuel ratio. There is a best efficiency operating point of engine speed $N_{ENG}$ and torque $TQ_{ENG}$ where engine efficiency $\mu_{ENG}$ is greatest for a desired engine power $P_{ENG\_D}$. When the desired power $P_{ENG\_D}$ decreases from the best efficiency operating point, the efficiency $\mu_{ENG}$ decreases accordingly because the throttle valve throttles intake airflow and generates engine pumping loss. So, a maximum efficiency line $ME_{ENG1}$ can be drawn to extend in a direction of the engine speed near a maximum torque line.

In the present embodiment, the throttle valve 49 is basically fully open as controlled at the steps S505 and S506 of the routine R5, and the pressure in the intake manifold 47 is substantially an atmospheric pressure, and there is no pumping loss, while the valve drive mechanism 101 can regulate the intake mass airflow in proportion to the desired engine torque $TQ_{ENG\_D}$ as controlled at the steps S502 through S504. When the valve drive mechanism 101 regulates the intake airflow, the maximum efficiency line is lowered to a line $ME_{ENG2}$, and the best efficiency point is lowered as well.

Figure 13:
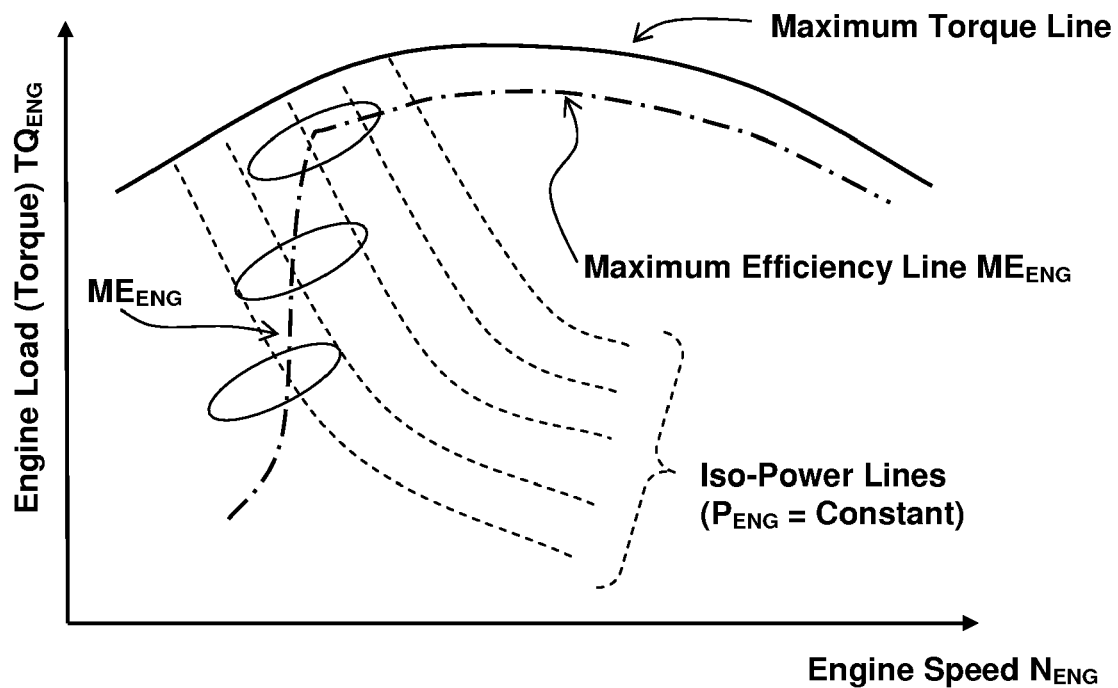
FIG. 13 is a diagram showing performance and efficiency of the engine according to the embodiment of the present description.

By connecting the best efficiency points for the various engine powers, the maximum efficiency line $ME_{ENG}$ for the present embodiment can be drawn as shown in FIG. 13. Therefore, the engine efficiency $\mu_{ENG}$ can be maintained substantially the best by following the maximum efficiency line $ME_{ENG}$, even when the desired engine $P_{ENG\_D}$ decreases from the best operating point in FIG. 12. At the same time, the air fuel ratio is adjusted to be stoichiometric at the steps S507 and S508 of the routine R5, and the catalytic converter 51 may perform most efficiently if it is the most conventional three-way catalyst.

Figure 14:
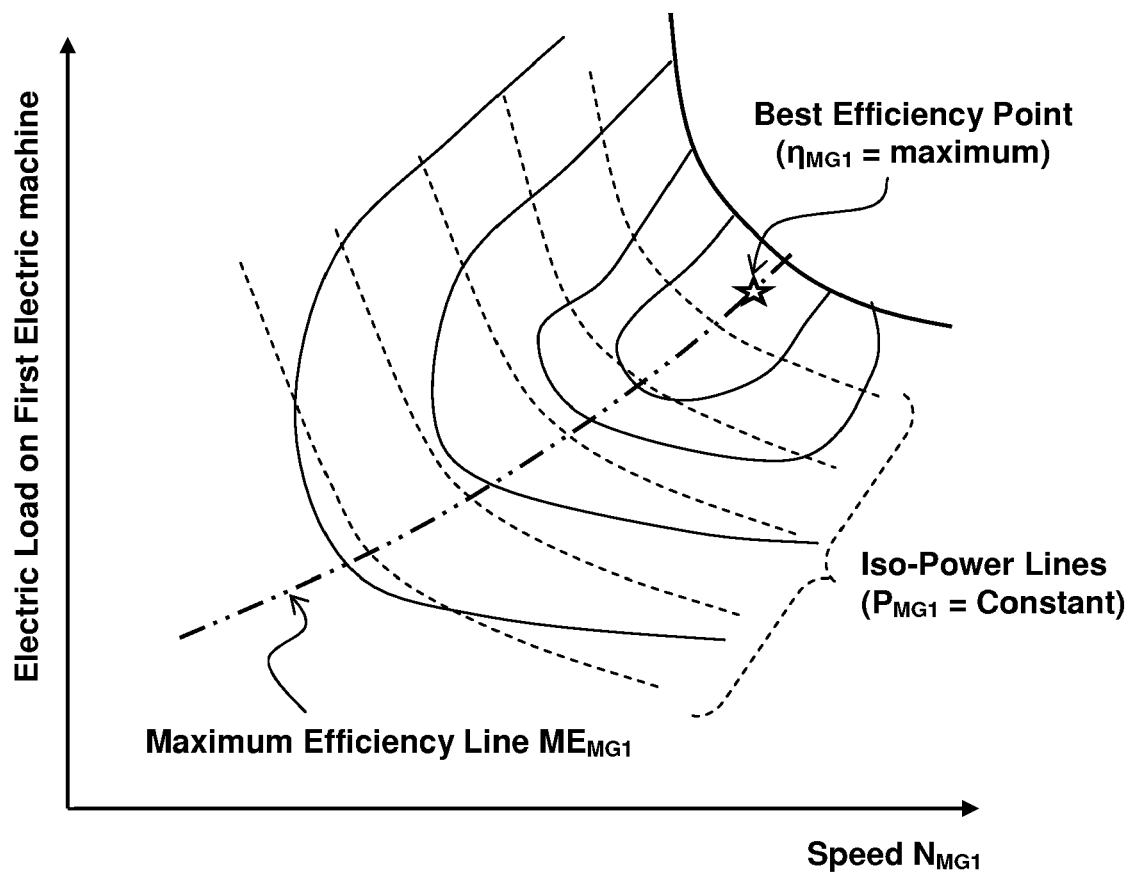
FIG. 14 is a diagram showing performance and efficiency of an electric machine.

FIG. 14 shows a performance and efficiency diagram of the first electric machine 3. Given that the maximum power and maximum speed are set corresponding to those of the engine 2 because both of the rotary machines are coupled with a fixed gear ratio, a best efficiency operating point of the first electric machine 3 where its efficiency $\mu_{MG1}$ is best is at a higher speed, compared to the best efficiency point of the engine shown in FIG. 12. For a particular electric power $P_{MG1}$, there is one single operating point with maximum efficiency, and these points are on a maximum efficiency line. Therefore, the efficiency $\mu_{MG1}$ can be maintained maximum for a particular desired electric power $P_{MG1\_D}$, by following the maximum efficiency line $ME_{MG1}$.

Figure 15:
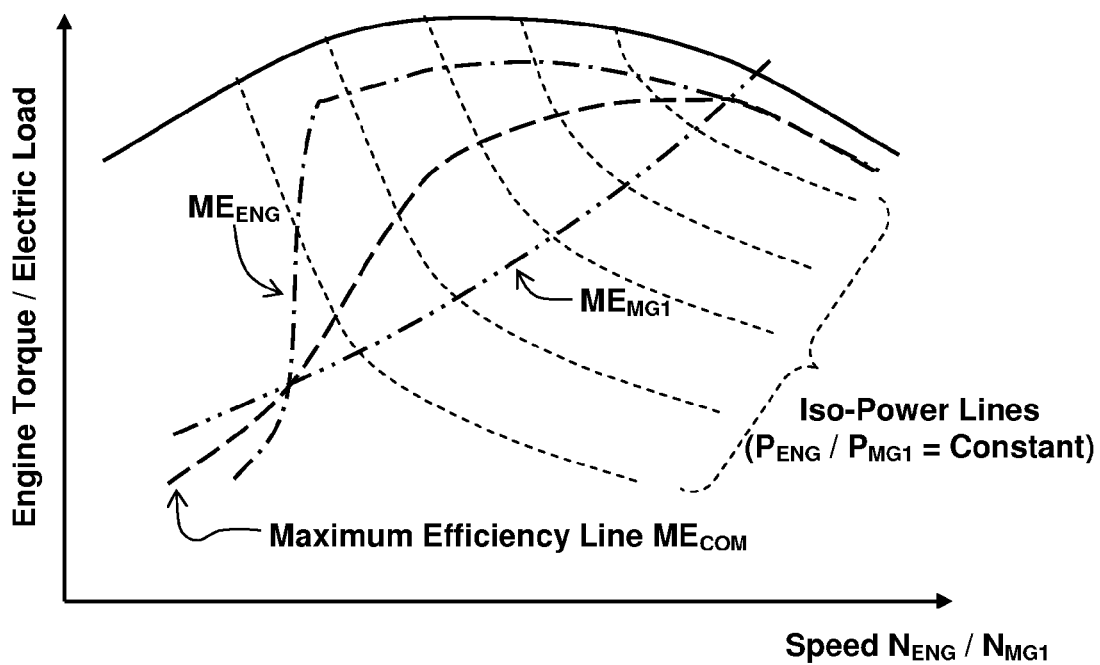
FIG. 15 is a diagram showing performance and combined efficiency of the engine and the electric machine according to the embodiment of the present description.

A maximum efficiency line $ME_{COM}$ can be drawn, as shown in FIG. 15, by connecting operating points where a combined efficiency $\mu_{COM}(=\mu_{ENG}*\mu_{MG1})$ is maximum for one particular desired power $P_{MG1\_D}$. This also can be understood by comparing the maximum efficiency lines $ME_{ENG}$ and $M_{ENG1}$ in FIGS. 13 and 14, and from the fact that the load and speed of the engine 2 and the first electric machine 3 are corresponding to each other. Therefore, once the desired electric power $P_{MG1\_D}$ to be output from the first electric machine 3 is determined, the desired speed $N_{MG1\_D}$ ($N_{ENG\_D}$) can be found on the maximum efficiency line $ME_{COM}$. In other words, a particular desired power $P_{MG1\_D}$ has a single desired speed $N_{ENG\_D}$. In the present embodiment, the HEV controller 14 makes this determination at the step S302 of the routine R3 shown in FIG. 8.

In the embodiment, the maximum efficiency line $ME_{COM}$ for the combined efficiency $\mu_{COM}(=\mu_{ENG}*\mu_{MG1})$ of the engine 2 and the first electric machine 3 is determined beforehand, and an operating point for particular desired power on the line $ME_{COM}$ is read out at the step S302. For further accuracy, however, the maximum efficiency line $ME_{COM}$ may be determined, for each time, depending on current operating conditions such as an intake air temperature, an ambient air temperature, atmospheric pressure, or any other condition that may affect operating efficiency of the engine 2 or the first electric machine 3. This may further improve the overall operating efficiency of the series HEV power-train 1.

On the other hand, when a difference between the maximum combined efficiency lines $ME_{COM}$ and the maximum efficiency line $ME_{MG1}$ for the first electric machine 3 is smaller, an operating point for particular desired power may be determined simply on the maximum efficiency line $ME_{MG1}$ for the first electric machine 3.

Variations of Engine Control

Figure 16:
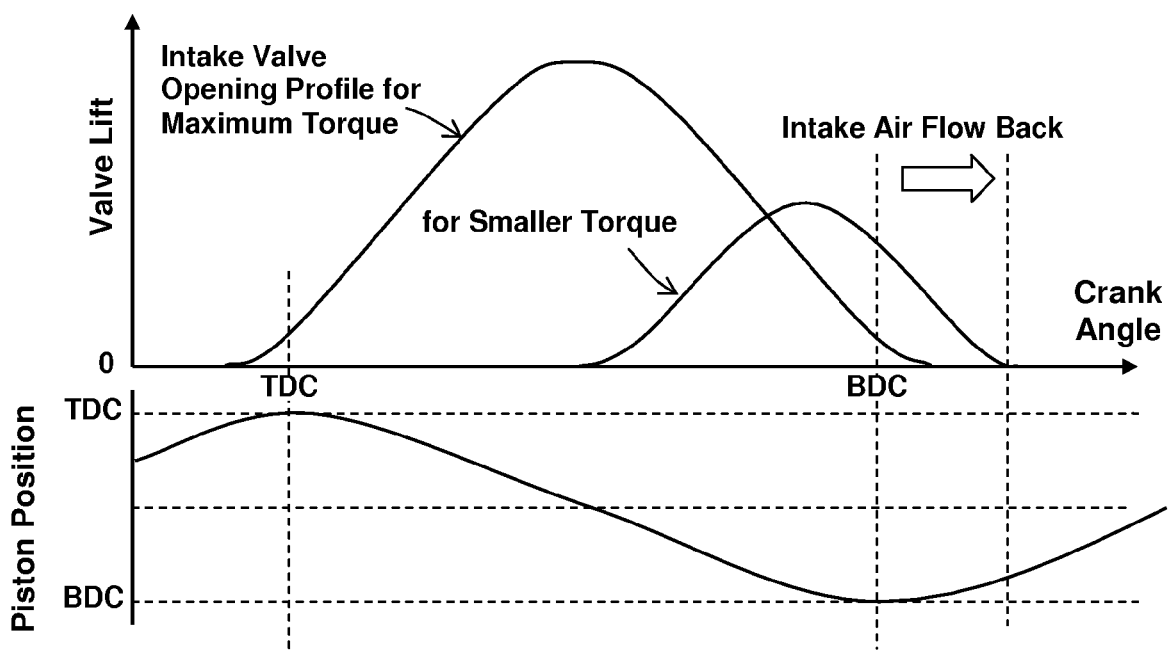
FIG. 16 is a diagram showing opening profiles of valve lift of the intake valve according to another embodiment of the present description.

In the above embodiment, for smaller engine torque, the intake valve 41 opens just before a top dead center (TDC) and closes before a bottom dead center (BDC), as shown in FIG. 11. However, to regulate the output torque, the intake valve may be closed after BDC, as shown in FIG. 16. Then, the inducted air in the cylinder may flow back to the intake port 28 when the piston 25 moves upward after BDC, and the cylinder air charge may be reduced without closing the throttle valve 49 nor causing pumping loss of the engine 2.

Figure 17:
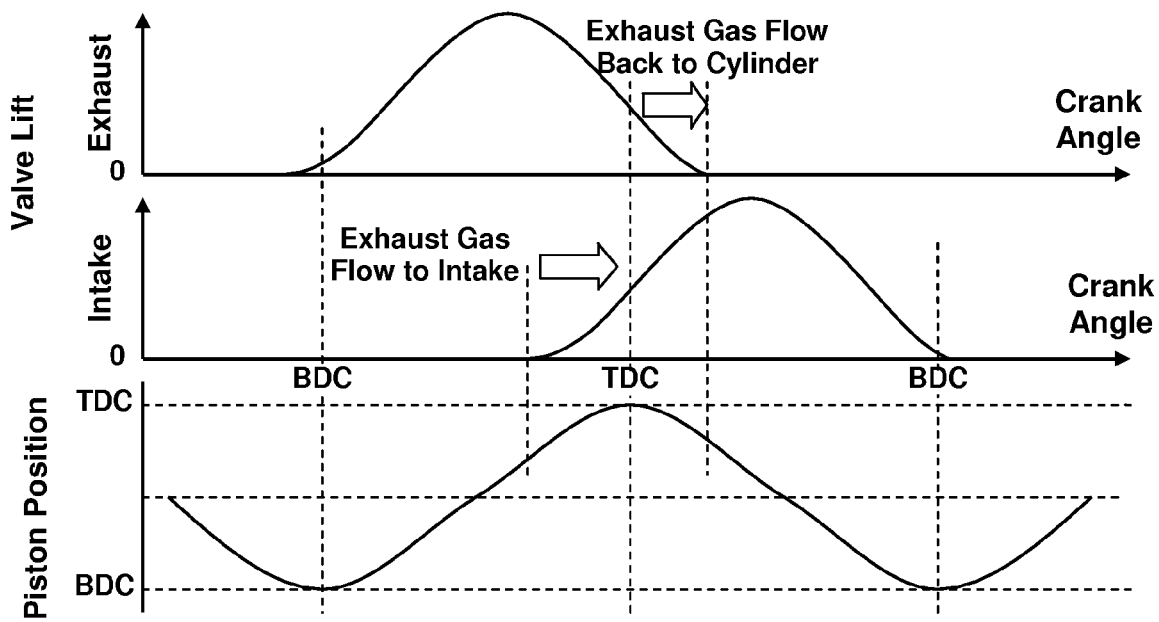
FIG. 17 is a diagram showing opening profiles of valve lift of the intake and exhaust valves according to another embodiment of the present description.

When the valve drive mechanism 102 for the exhaust valves 42 has at least the VCT mechanism 103, internal EGR can be adjusted by adjustably retarding the exhaust cam timing after TDC, as shown in FIG. 17. The exhaust gas once flows out before TDC, and flows back into the cylinder after TDC. Therefore, the mass of the exhaust gas back into the cylinder can be controlled by adjusting the closing timing of the exhaust valve 42. Also, by adjustably advancing the intake valve opening timing before TDC, the exhaust gas once flows to the intake manifold 47 before TDC, and flows back into the cylinder after TDC. The change of exhaust gas mass in the cylinder may cause a change of combustible air mass in the cylinder from the intake manifold 47. Consequently, by adjusting the internal EGR, the combustible air mass in the cylinder may be adjusted to be desired amount, and it may enable the throttle valve 49 to be fully opened and the pressure in the intake manifold 47 to be maintained.

In the above embodiment, the VVL actuator 123 adjusts valve lift for all of the intake valves 42 through the one control shaft 130, as shown in FIG. 3. However, a plurality of the VVL actuators 123 and the control shafts 130 may be provided, so that the valve lift may be independently adjusted for the respective cylinder or cylinder groups. In that case, the valve drive mechanism 101 in the above embodiment can adjust the valve lift of particular valve to be zero, and that particular valve 42 can keep the intake air port 28 closed. Therefore, some of the cylinders, for example #2 and #3 cylinders under the conventional #1-#3-#4-#2 combustion sequence for the four cylinder engine 2, may be deactivated by controlling some of the VVL actuators 123 to make the corresponding valve lift zero. Consequently, the intake airflow to the engine 1 can be significantly reduced while maintaining the intake manifold pressure, or in other words, without generating pumping loss, so that engine efficiency $\eta_{ENG}$ at a lower torque may be improved. Of course, when a cylinder is deactivated, fuel supply to the deactivated cylinder is shut out.

When deactivating cylinders, the valve drive mechanism 102 for the exhaust valves may be employed instead of or in addition to the mechanism 101 for the intake valves. When only the exhaust valve 42 is kept closed while the intake valve 41 is opening, the air flows from and to the intake port 28 and is compressed in the combustion chamber without any combustion, but is not exhausted to the exhaust system. Therefore, the air fuel ratio of the gas exhausted to the exhaust system including the catalyst converter 51 is maintained stoichiometric, so that the conventional three-way catalyst can be employed, and can perform at its maximum performance.

Cylinder operating efficiency may vary depending on air charge in a single cylinder, and a friction loss of the whole engine system depends on the engine speed. Therefore, by comparing engine efficiency $\eta_{ENG}$ for a particular operating point between with and without the cylinder deactivation, it can be determined whether or not to employ the cylinder deactivation strategy.

Figure 18:
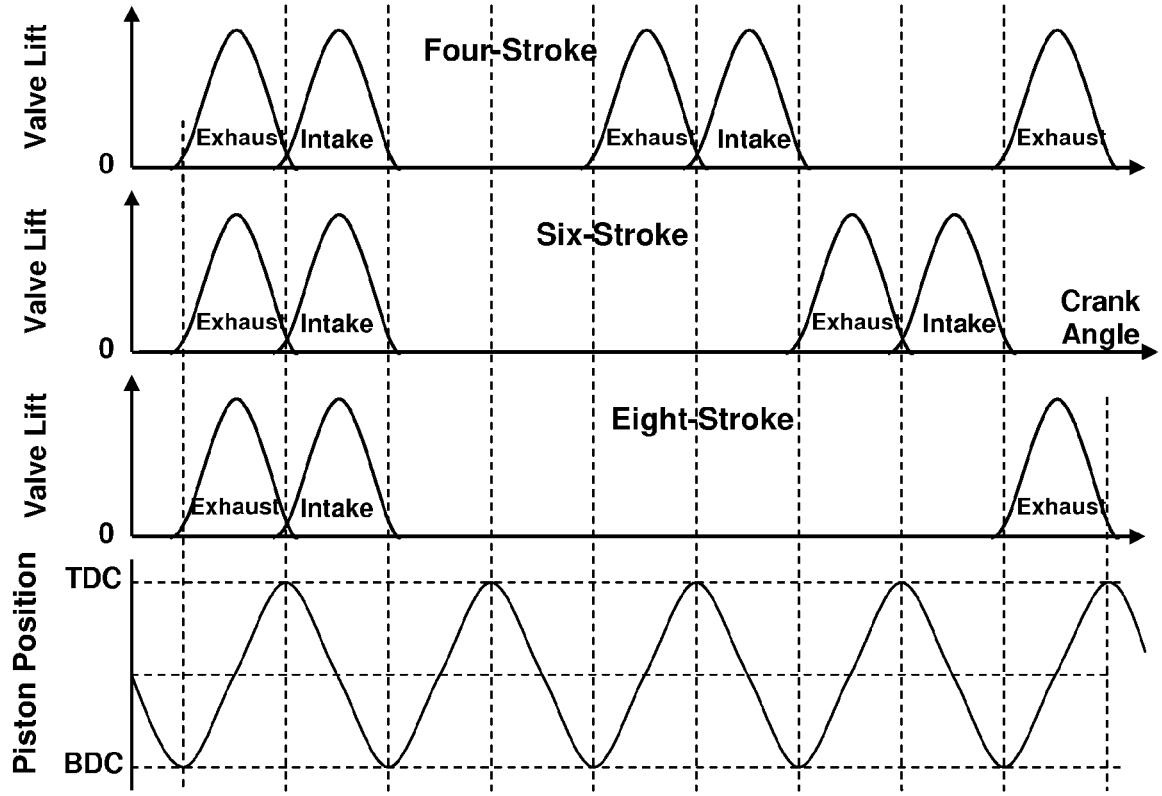
FIG. 18 is a diagram showing opening profiles of valve lift of the intake and exhaust valves according to another embodiment of the present description.

The valve drive mechanism 101 or 102 is not limited to the variable valve lift mechanism described above. Instead, for example, an electromagnetic valve actuator may be employed. The electric valve actuator may comprise an armature fixed to a step of the valve 41 or 42 and electromagnetic coils arranged both sides of the armature in the valve operating direction, as described in U.S. patent application Ser. No. 11/393,416. The electromagnetic valve actuator can vary valve opening profile independently from the crankshaft rotation, in addition to the function of the valve drive mechanism 101 described above, i.e. the valve lift variation and the cylinder deactivation. For example, the electromagnetic valve actuator may enable choice of number of strokes in one engine cycle for one individual cylinder. For example, as shown in FIG. 18, four strokes, six strokes, eight strokes or any even number strokes in an engine cycle may be obtained. The change of the number of strokes may provide a further option to adjust the engine torque while maintaining the intake manifold pressure.

Figure 19:
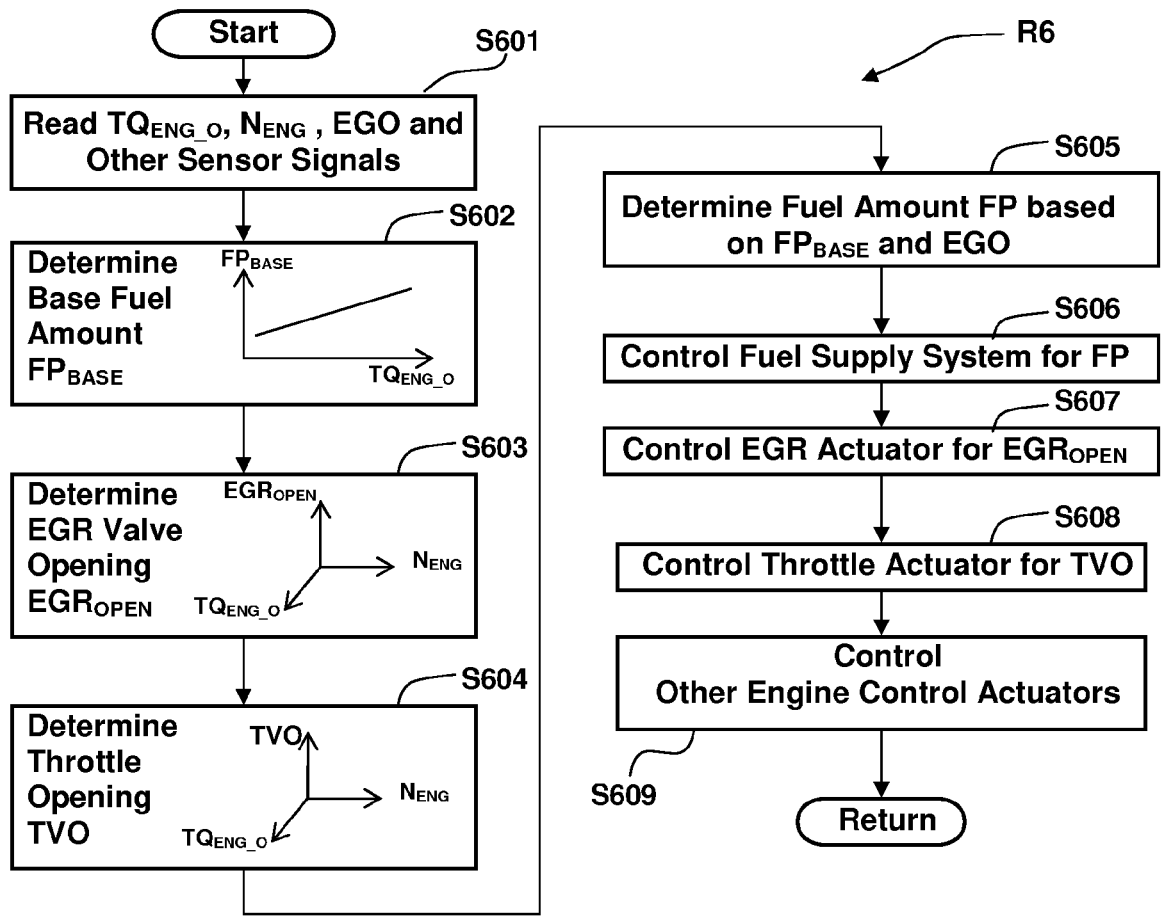
FIG. 19 is a flowchart showing a control routine R6 executed by an engine controller shown in FIGS. 1 and 2, according to another embodiment of the present description.

The valve drive mechanisms 101 and 102 may also be a conventional valve drive mechanism including camshafts, which the crankshaft 21 drives through a cam drive mechanism such as a chain. Then, the valve timing and lift are not adjusted. Instead of the control routine R5 shown in FIG. 10, the engine controller 15 controls the engine 2 in accordance with another control routine R6 shown in FIG. 19.

After the start, the control routine R6 proceeds to a step S601, and reads an operating engine torque $TQ_{ENG\_O}$ from the HEV controller 14, an engine speed $N_{ENG}$ from the crank angle sensor 63, an exhaust gas oxygen signal EGO from the exhaust gas oxygen sensor 64, and other sensor signals described above. Then, the routine R6 proceeds to a step S602, and determines a base fuel amount $FP_{BASE}$ for a single engine cycle of a single cylinder based on the operating engine torque $TQ_{ENG\_O}$. The base fuel amount $FP_{BASE}$ is basically in proportion of the engine torque $TQ_{ENG\_O}$, because, in theory, the engine generates energy proportionally to the amount of combusted fuel. Next, the routine R6 proceeds to a step S603, and determines an opening $EGR_{OPEN}$ of the EGR valve 53, by referring to an $EVR_{OPEN}$ map or table, where the opening $EGR_{OPEN}$ is mapped on the $TQ_{ENG\_O}$ and the engine speed $N_{ENG}$. The opening $EGR_{OPEN}$ is set basically in negative proportion of the engine torque $TQ_{ENG\_O}$. Then, the routine R6 proceeds to a step S604, and determines an opening TVO of the throttle valve 49, by referring to a TVO map or table, where the opening TVO is mapped on the $TQ_{ENG\_O}$ and the engine speed $N_{ENG}$. The throttle opening TVO is basically in proportion to the $TQ_{ENG\_O}$. The openings $EGR_{OPEN}$ and TVO for the EGR valve 53 and the throttle valve 49 are set so that exhaust gas and the fresh air flow into the combustion chamber 27, and mixes there with the amount $FP_{BASE}$ of fuel to make the stoichiometric air fuel ratio while maintaining the pressure in the intake manifold 47.

At the next step S507, the routine R6 determines a fuel amount FP based on the base fuel amount $FP_{BASE}$ determined at the step S602 by correcting the $FP_{BASE}$ with the exhaust gas oxygen concentration EGO read at the step S601, so that the air fuel in the exhaust manifold 50 is feedback controlled to be stoichiometric. Then the routine R6 proceeds to a step S606, and the engine controller 15 controls the fuel supply system 46 to supply the of fuel amount FP through the injector 45 to the engine 2. The routine R6 proceeds to steps S607 and S608, and the engine controller 15 controls the EGR actuator 53A to adjust the EGR valve 53 to the opening $EGR_{OPEN}$ determined at the step S603, and the throttle actuator 49a to adjust the throttle valve 49 to the opening TVO determined at the step S604. Finally at a step S609, the routine R6 determines fuel injection timing, ignition timing and other engine operating parameters, and controls the respective actuators for the determined parameters. Then, the routine R6 returns.

As described above, even when using the conventional valve drive mechanism, the routine R6 can control the air fuel ratio to be stoichiometric while maintaining the intake manifold pressure for a range of the operating engine torque $TQ_{ENG\_O}$. Therefore, the conventional three-way catalyst can be employed for the catalytic converter 51.

However, if an exhaust gas after-treatment system including the catalytic converter 51 can purify exhaust gas having a lean air fuel ratio, the amount of EGR or the $EGR_{OPEN}$ determined at the step S603 may be reduced, or even the exhaust gas recirculation may be omitted to perform. Such an after-treatment system may include NOx trap, and may store the NOx in the lean exhaust gas in the NOx trap and purge the trap by operating the engine 2 with a rich or stoichiometric air fuel ratio. In the case of no exhaust gas recirculation, the air fuel ratio of the air fuel mixture inducted into the combustion chamber 27 is varied to be leaner in accordance with a decrease of the operating engine torque $TQ_{ENG\_O}$.

Further in the above case, when setting the air fuel ratio, it can be set individually for the cylinder. For example, a lean air fuel ratio is set for #2 and #3 cylinders, and the stoichiometric air fuel ratio is set for #1 and #4 cylinders, under the conventional #1-#3-#4-#2 combustion sequence for the four cylinder engine 2. Also, the fuel supply is entirely shut off for some of the cylinders, such as #2 and #3 cylinders, and the remaining cylinders are run at the stoichiometric air fuel ratio.

It is needless to say that the invention is not limited to the illustrated embodiments and that various improvements and alternative designs are possible without departing from the substance of the invention as claimed in the attached claims.

The invention claimed is:

1. A method of controlling a power-train of a hybrid electric vehicle comprising an internal combustion engine, a first electric machine directly driven by said internal combustion engine for generating electricity, and a second electric machine driven at least partly with said electricity for driving the vehicle wheels, the method comprising:
adjusting the speed and the torque of said internal combustion engine, while substantially maintaining the intake manifold pressure, in response to a change of the desired electricity from said first electric machine.

2. The method as described in claim 1, wherein the torque of said internal combustion is adjusted by adjusting fuel supplied to said engine while adjusting a valve lift of an intake or exhaust valve of said engine.

3. The method as described in claim 2, wherein the valve lift is adjusted by adjusting closing timing of said intake valve.

4. The method as described in claim 2, wherein the valve lift is adjusted by adjusting closing timing of said exhaust valve or opening timing of said intake valve, thereby adjusting internal exhaust gas recirculation.

5. The method as described in claim 1, wherein the torque of said internal combustion engine is adjusted by adjusting fuel supplied to said engine while adjusting the air fuel ratio of air fuel mixture charged to said engine.

6. The method as described in claim 1, wherein the torque of said internal combustion engine is adjusted by adjusting fuel to be supplied to said engine while adjusting the exhaust gas re-circulated to said engine.

7. The method as described in claim 1, wherein the torque of said internal combustion engine is adjusted by adjusting number of active cylinders of said engine.

8. The method as described in claim 7, wherein the number of active cylinders is adjusted by shutting off fuel to at least one of said cylinders.

9. The method as described in claim 8, further comprising deactivating an intake or exhaust valve of said at least one of the cylinders.

10. The method as described in claim 1, wherein the torque of said internal combustion engine is adjusted by adjusting number of strokes of an engine cycle.

11. The method as described in claim 1, wherein said electricity generated by said first electric machine substantially solely drives said second electric machine.

12. The method as described in claim 1, further comprising taking account of operating efficiency of said first electric machine to adjust its speed corresponding to said speed of said internal combustion engine.

13. The method as described in claim 12, further comprising taking account of operating efficiency of said internal combustion engine to adjust its speed and torque.

14. A method of controlling a power-train of a hybrid electric vehicle comprising an internal combustion engine, a first electric machine directly driven by said internal combustion engine for generating electricity, and a second electric machine driven at least partly with said electricity for driving the vehicle wheels, the method comprising:
adjusting electricity supplied to said second electric machine in response to a change of the desired output from said power-train; and
adjusting the speed and the torque of said internal combustion engine, while substantially maintaining the intake manifold pressure, in response to said desired power-train output change.

15. The method as described in claim 14, wherein said electricity generated by said first electric machine substantially solely drives said second electric machine.

16. The method as described in claim 14, wherein the speed and the torque of said internal combustion engine are adjusted, further in response to a change of demand to charge an electric battery.

17. The method as described in claim 16, wherein said electricity generated by said first electric machine substantially solely drives said second electric machine, when there is no demand to charge said electric battery.

18. The method as described in claim 14, wherein the torque of said internal combustion is adjusted by adjusting fuel supplied to said engine while adjusting a valve lift of an intake or exhaust valve of said engine.

19. The method as described in claim 14, wherein the torque of said internal combustion engine is adjusted by adjusting fuel supplied to said engine while adjusting the air fuel ratio of air fuel mixture charged to said engine.

20. The method as described in claim 14, wherein the torque of said internal combustion engine is adjusted by adjusting fuel to be supplied to said engine while adjusting the exhaust gas re-circulated to said engine.

21. The method as described in claim 1, further comprising:
determining a desired electric power to be output from said first electric machine based on operating conditions of said power-train; and
adjusting the speed of said internal combustion engine based on said desired electric power to be output from said first electric machine using a maximum efficiency line of said first electric machine.

22. The method as described in claim 21, further comprising:
setting a combined maximum efficiency line from said maximum efficiency line of said first electric machine and a maximum efficiency line of said engine which is lowered to a lower torque side by regulating the intake airflow while substantially maintaining said intake manifold pressure; and
adjusting the speed of said internal combustion engine based on said desired electric power to be output from said first electric machine and said combined maximum efficiency line.

23. The method as described in claim 1, further comprising:

during a first mode, adjusting the speed of said internal combustion engine by an engine torque control without adjusting an operating power of said first electric machine; and during a second mode, adjusting the speed of said internal combustion engine by said operating power of said first electric machine in addition to said engine torque control.

24. The method as described in claim 23, further comprising:

determining a desired engine speed based on operating conditions of said power-train;

implementing said first mode when a difference between said desired engine speed and an actual engine speed is not greater than predetermined speed difference; and implementing said second mode when a difference between said desired engine speed and an actual engine speed is greater than predetermined speed difference.

25. The method as described in claim 24, further comprising:

setting a combined maximum efficiency line from said maximum efficiency line of said first electric machine and a maximum efficiency line of said engine which is lowered to a lower torque side by regulating the intake airflow while substantially maintaining said intake manifold pressure; and determining a desired engine speed from said desired electric power to be output from said first electric machine and said combined maximum efficiency line.

26. The method as described in claim 14, further comprising:

determining a desired electric power to be output from said first electric machine based on operating conditions of said power-train; and adjusting the speed of said internal combustion engine based on said desired electric power to be output from said first electric machine using a maximum efficiency line of said first electric machine.

27. The method as described in claim 14, further comprising:

during a first mode, adjusting the speed of said internal combustion engine by an engine torque control without adjusting an operating power of said first electric machine; and during a second mode, adjusting the speed of said internal combustion engine by said operating power of said first electric machine in addition to said engine torque control.

* * * * *